US012038145B2

(12) United States Patent
Lee

(10) Patent No.: US 12,038,145 B2
(45) Date of Patent: Jul. 16, 2024

(54) LIGHTING APPARATUS AND MOBILE VEHICLE COMPRISING LIGHTING APPARATUS

(71) Applicant: SEOUL SEMICONDUCTOR CO., LTD., Ansan-si (KR)

(72) Inventor: Jang Weon Lee, Ansan-si (KR)

(73) Assignee: SEOUL SEMICONDUCTOR CO., LTD., Ansan-si (KR)

( * ) Notice: Subject to any disclaimer, the term of this patent is extended or adjusted under 35 U.S.C. 154(b) by 0 days.

(21) Appl. No.: 18/317,581

(22) Filed: May 15, 2023

(65) Prior Publication Data

US 2023/0280011 A1 Sep. 7, 2023

Related U.S. Application Data

(63) Continuation of application No. 17/478,581, filed on Sep. 17, 2021, now Pat. No. 11,649,940, which is a continuation of application No. PCT/KR2020/003710, filed on Mar. 18, 2020.

(30) Foreign Application Priority Data

Mar. 20, 2019 (KR) ........................ 10-2019-0031937

(51) Int. Cl.
*F21S 41/33* (2018.01)
*F21S 41/148* (2018.01)

(52) U.S. Cl.
CPC ............. *F21S 41/33* (2018.01); *F21S 41/148* (2018.01)

(58) Field of Classification Search
CPC ................................ F21S 41/33; F21S 41/148
See application file for complete search history.

(56) References Cited

U.S. PATENT DOCUMENTS

| | | | |
|---|---|---|---|
| 9,458,976 | B2 | 10/2016 | Krenn |
| 10,151,439 | B2 | 12/2018 | Woodward |
| 2010/0110711 | A1 | 5/2010 | Ookubo et al. |
| 2016/0281949 | A1 | 9/2016 | Igarashi |
| 2017/0234503 | A1 | 8/2017 | Buffone |

(Continued)

FOREIGN PATENT DOCUMENTS

| | | | |
|---|---|---|---|
| JP | 2018098079 | A | 6/2018 |
| KR | 1020130036382 | A | 4/2013 |

(Continued)

OTHER PUBLICATIONS

European Search Report from corresponding EP Patent Application No. 20772586.2, dated Oct. 27, 2022 (6 bages).

(Continued)

*Primary Examiner* — Thomas M Sember
(74) *Attorney, Agent, or Firm* — Perkins Coie LLP

(57) ABSTRACT

A lighting apparatus includes a light source part having a first light source and a second light source provided away from the first light source, a reflective part provided away from the first light source and second light source and reflecting light emitted from the first light source and second light source, and a support part facing the reflective part and supporting the light source part. The reflective part includes a plurality of reflective plates which are continuously provided. Each of the reflective plates provided adjacent to one another has a reflective surface which is shaped differently from one another.

20 Claims, 29 Drawing Sheets
(17 of 29 Drawing Sheet(s) Filed in Color)

(56) References Cited

U.S. PATENT DOCUMENTS

| | | | |
|---|---|---|---|
| 2018/0187854 A1 | 7/2018 | Sato | |
| 2022/0003378 A1 | 1/2022 | Lee | |

FOREIGN PATENT DOCUMENTS

| | | |
|---|---|---|
| KR | 10-20150009176 A | 1/2015 |
| KR | 2015-0009176 | 1/2015 |
| KR | 1020150009176 A | 1/2015 |
| KR | 1020180136262 A | 12/2018 |

OTHER PUBLICATIONS

International Search Report for International Application No. PCT/KR2020/003710, mailed Sep. 28, 2020, 6 pages.

Office Action from corresponding Korean Patent Application No. 10-2019-0031937, dated Jan. 28, 2024.

Office Action from corresponding European Patent Application No. 20772586.2, dated Apr. 26, 2024.

LIGHTING APPARATUS AND MOBILE VEHICLE COMPRISING LIGHTING APPARATUS

CROSS-REFERENCE OF RELATED APPLICATIONS AND PRIORITY

The present application is a continuation of U.S. patent application Ser. No. 17/478,581, filed on Sep. 17, 2021, which is a continuation of International Application No. PCT/KR2020/003710 filed Mar. 18, 2020, which claims priority to and benefit of Korean Patent Application No. 10-2019-0031937, filed Mar. 20, 2019. The aforementioned applications of which are hereby incorporated by reference in their entireties.

TECHNICAL FIELD

Embodiments of the present disclosure relate to a lighting apparatus and a mobile vehicle including the same.

BACKGROUND

In general, a vehicular headlamp is provided to a front side of a vehicle to assist in securing a driver's line of sight by emitting light in front of the vehicle. The headlamp may provide high beam and low beam according to driver manipulation. Here, the headlamp is required to emit a suitable quantity of light within a suitable range so as to satisfy the purpose thereof upon emission of high beam and low beam. The headlamp is required to have a design within the range capable of satisfying the above purpose. Therefore, there is a need for a novel lighting apparatus structure that has a high degree of design freedom while performing a desired illumination function.

SUMMARY

Embodiments of the present disclosure provide a lighting apparatus having a small size and a high degree of design freedom. In accordance with one embodiment of the present disclosure, a lighting apparatus includes a light source unit including a first light source and a second light source separated from the first light source; a reflector separated from the first light source and the second light source and reflecting light emitted from the first light source and the second light source; and a support facing the reflector and supporting the light source unit, wherein the reflector includes multiple reflective plates continuously arranged and each of the reflective plates disposed adjacent to each other among the multiple reflective plates has a reflective surface with a different shape than reflective surfaces of other reflective plates.

In at least one variant, the reflective surfaces of the multiple reflective plates may have different shapes of aspherical surfaces.

In another variant, the multiple reflective plates may be continuously arranged in a matrix having columns extending in a first direction and rows extending in a second direction perpendicular to the first direction.

In another variant, the multiple reflective plates may include at least one central reflective plate disposed on an imaginary line extending from the first light source in the second direction, and the central reflective plate may have a greater width than other reflective plates excluding the central reflective plate in the first direction.

In another variant, the reflective plates arranged in the same column in the first direction may have a symmetrical shape with reference to the central reflective plate disposed in the column.

In another variant, at least one of the reflective plates arranged in the same row in the second direction may have a different width than other reflective plates arranged in the row.

In another variant, among the reflective plates arranged in the same row in the second direction, the reflective plate separated farthest from the first light source may have a narrower width than other reflective plates arranged in the row in the second direction.

In another variant, among the reflective plates arranged in the same row in the second direction, the reflective plate separated farthest from the first light source may have a reflective surface parallel to the support in at least some region.

In another variant, the reflective plates arranged in the same row in the second direction may have reflective surfaces with different shapes.

In another variant, the multiple reflective plates may be arranged in a step shape in which distal ends of the multiple reflective plates have different heights.

In another variant, the first light source and the second light source may be disposed on the same plane of the support.

In another variant, the shortest distance between the first light source and the reflector may be less than the shortest distance between the second light source and the reflector.

In another variant, a distance between a center of the first light source and a center of the second light source may range from 0.8 mm to 1.2 mm.

In another variant, the first light source and the second light source may be independently controlled.

In another variant, each of the first light source and the second light source may be included in plural in the light source unit.

In another variant, each of the light source unit and the reflector may be disposed in plural.

In another variant, the light source unit may include: a substrate on which the first light source and the second light source are mounted; and a socket disposed on the substrate and connecting the first light source and the second light source to an external power source.

In another variant, the support may further include a heat dissipation member to remove heat from the first light source and the second light source.

In another variant, the lighting apparatus may further include a housing that covers the light source unit, the support, and the reflector.

In one embodiment, a mobile vehicle includes a vehicle body, a power generator generating power, a drive unit driving the vehicle body with the power generated from the power generator, a controller controlling the power generator and the drive unit, and a lighting apparatus provided to the vehicle body and emitting light. The lighting apparatus includes a light source unit including a first light source and a second light source separated from the first light source, a support supporting the light source unit, and a reflector separated from the first light source and the second light source and reflecting light emitted from the first light source and the second light source. The reflector includes multiple reflective plates continuously arranged and each of the reflective plates disposed adjacent to each other among the multiple reflective plates has a reflective surface with a different shape than reflective surfaces of other reflective plates.

In one or more embodiments, a lighting apparatus includes a light source unit including a first light source and a second light source separated from the first light source, a reflector spaced apart from the first light source and the second light source and structured to reflect light emitted from the first light source and the second light source, and a support structure supporting the light source unit such that light from the first light source, the second light source, or both reaches a reflective surface or a part of the reflective surface of the reflector. The reflector further includes a plurality of reflective plates that are continuously arranged in a matrix having columns extending in a first direction and rows extending in a second direction perpendicular to the first direction. The plurality of reflective plates includes at least one central reflective plate extending from the first light source in the second direction.

In at least one variant, the plurality of reflective plates further comprises two or more central reflective plates having reflective surfaces that collectively form an aspherical shape. Each reflective surface of the two or more central reflective plates is divided at a predetermined point and has a different shape of the aspherical surface.

In another variant, the reflector further comprises multiple reflective plates continuously arranged in the first direction and the second direction and each of the reflective plates has a reflective surface with a different shape than reflective surfaces of one or more neighboring reflective plates.

In another variant, the at least one central reflective plate has a greater width than other reflective plates arranged in other columns.

In another variant, the reflective plates arranged in the same column in the first direction have a symmetrical shape with reference to the central reflective plate disposed in the column.

In another variant, two or more of the reflective plates arranged in the same row in the second direction has different widths.

In another variant, among the reflective plates arranged in the same row in the second direction, a reflective plate separated farthest from the first light source has a narrower width than the rest of reflective plates arranged in that row in the second direction.

In another variant, among the reflective plates arranged in the same row in the second direction, a reflective plate separated farthest from the first light source has a reflective surface parallel to the support structure in at least some region.

In another variant, the reflective plates arranged in the same row in the second direction have reflective surfaces with different shapes.

In another variant, the plurality of reflective plates are arranged in a step shape such that distal ends of the plurality of reflective plates, from the at least one central reflective plate, have different heights.

In another variant, the first light source and the second light source are disposed on the same plane of the support structure, a shortest distance between the first light source and the reflector is less than a shortest distance between the second light source and the reflector, and a distance between a center of the first light source and a center of the second light source ranges from 0.8 mm to 1.2 mm.

In another variant, the first light source is operable to realize first type of lighting, the second light source is operable to realize second type of lighting, and the first light source and the second light source are independently controlled.

In another variant, each of the first light source and the second light source includes a plurality of light sources, and the reflector comprises a plurality of reflectors.

In another variant, the light source unit comprises a substrate on which the first light source and the second light source are mounted, and a socket disposed on the substrate and connecting the first light source and the second light source to an external power source.

In another variant, the lighting apparatus further includes a heat dissipation member to remove heat from the first light source and the second light source.

In another variant, the lighting apparatus further includes a housing covering the light source unit, the support structure, and the reflector.

In one or more embodiments, a mobile vehicle includes a vehicle body, a power generator generating power, a drive unit driving the vehicle body with the power generated from the power generator, a controller controlling the power generator and the drive unit, and a lighting apparatus provided to the vehicle body and emitting light. The lighting apparatus includes a light source unit comprising a first light source operable to realize first type of lighting and a second light source separated from the first light source and operable to realize second type of lighting along with the first type of lighting as needed, a support structure supporting the light source unit, and a reflector spaced apart from the first light source and the second light source and structured to reflect light emitted from the first light source and the second light source. The reflector further includes multiple reflective plates continuously arranged in a matrix including columns extending in a first direction and rows extending in a second direction perpendicular to the first direction. The reflective plates have different shapes and include reflective surfaces with different shapes such that light reflected from the reflective plates are delivered to different regions.

Upon operation of the first light source, the first type of lighting is configured such that most light emitted from the first light source and reflected from the reflector reaches a region of 0 degree or less in the second direction whereby the reflected light is focused on a road.

Upon operation of the first and the second light sources, the second type of lighting is configured such that a region of 0 degree or more and a region of 0 degree or less in the second direction are evenly illuminated with light reflected from the reflector. A central region on which the reflected light is focused is placed near a point at which a second direction axis meets a first direction axis.

According to one embodiment, a lighting apparatus having a small size and a high degree of design freedom may be provided.

In particular, according to one embodiment, both high beam and low beam can be realized by the lighting apparatus using a set of light sources and a reflector, thereby enabling substantial reduction in size of an apparatus including the lighting apparatus.

DESCRIPTION OF DRAWINGS

The patent or application file contains at least one drawing executed in color. Copies of this patent or patent application publication with color drawing(s) will be provided by the U.S. Patent and Trademark Office upon request and payment of the necessary fee.

FIG. 4A illustrates a shape of a first central reflective plate in a first column of the reflector and an illumination pattern of light reflected from the first central reflective plate;

FIG. 4B illustrates a shape of a fourth reflective plate in the first column of the reflector and an illumination pattern of light reflected from the fourth reflective plate;

FIG. 4C illustrates a shape of a sixth reflective plate in the first column of the reflector and an illumination pattern of light reflected from the sixth reflective plate;

FIG. 4D illustrates a shape of a third reflective plate in the first column of the reflector and an illumination pattern of light reflected from the third reflective plate;

FIG. 4E illustrates a shape of a seventh reflective plate in the first column of the reflector and an illumination pattern of light reflected from the seventh reflective plate;

FIG. 4F illustrates a shape of a second reflective plate in the first column of the reflector and an illumination pattern of light reflected from the second reflective plate;

FIG. 4G illustrates a shape of an eighth reflective plate in the first column of the reflector and an illumination pattern of light reflected from the eighth reflective plate;

FIG. 4H illustrates a shape of a first reflective plate in the first column of the reflector and an illumination pattern of light reflected from the first reflective plate; and FIG. 4I illustrates a shape of a ninth reflective plate in the first column of the reflector and an illumination pattern of light reflected from the ninth reflective plate.

FIG. 5A illustrates the shape and the reflection pattern of the first central reflective plate;

FIG. 5B illustrates the shape and the reflection pattern of a second central reflective plate;

FIG. 5C illustrates the shape and the reflection pattern of a third central reflective plate; and FIG. 5D illustrates the shape and the reflection pattern of a fourth central reflective plate.

DETAILED DESCRIPTION OF EMBODIMENTS

Figure 1:
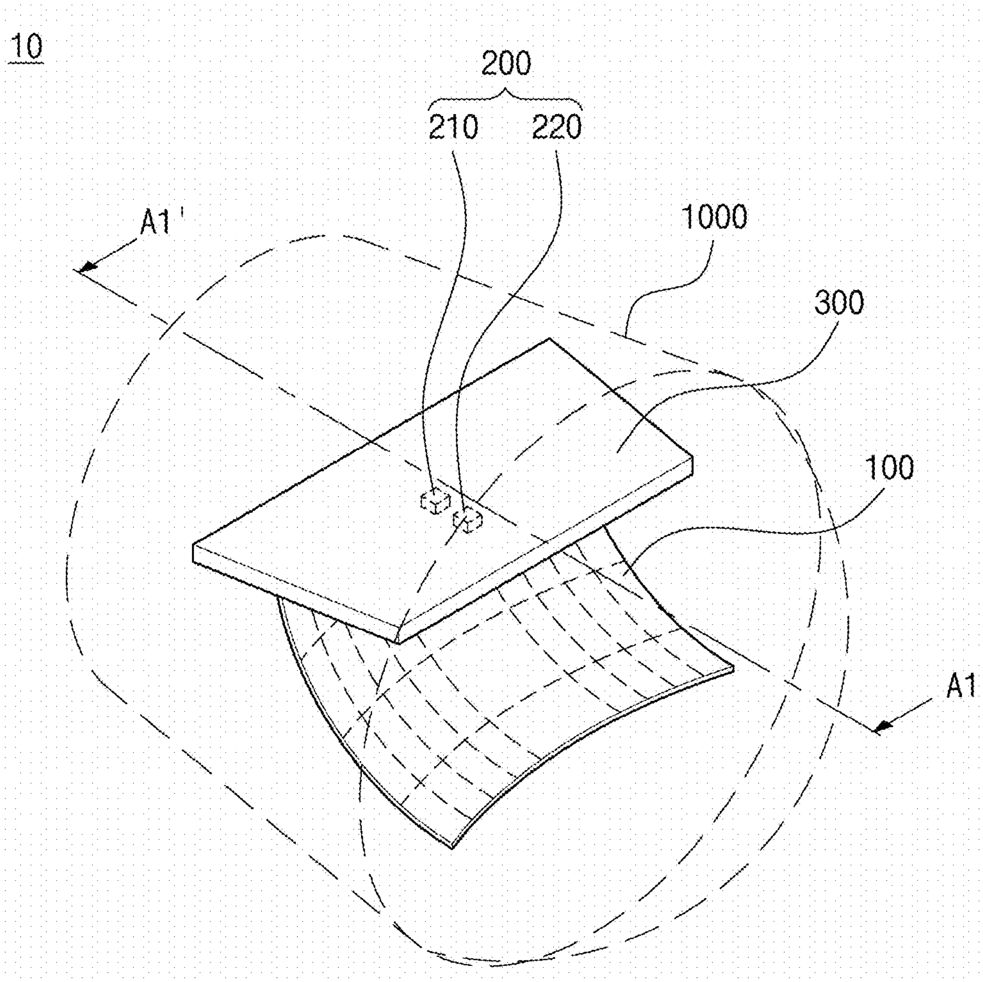
FIG. 1 is a perspective view of a lighting apparatus according to one embodiment of the present disclosure.

The present disclosure may be realized by various embodiments and some exemplary embodiments will be described in detail with reference to the accompanying drawings. However, it should be understood that the present disclosure is not limited to the following embodiments, and that various modifications, substitutions, and equivalent embodiments can be made by those skilled in the art without departing from the spirit and scope of the present disclosure.

Like components will be denoted by like reference numerals throughout the specification. It should be noted that the drawings may be exaggerated in thickness of lines or size of components for descriptive convenience and clarity only. It will be understood that, although the terms “first”, “second”, and the like may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a “first” element or component discussed below could also be termed a “second” element or component, or vice versa, without departing from the scope of the present disclosure. As used herein, the singular forms “a”, “an” and “the” are intended to include the plural forms as well, unless the context clearly indicates otherwise.

It will be understood that the terms “includes”, “comprises”, “including” and/or “comprising,” when used in this specification, specify the presence of stated features, steps, operations, elements, and/or components, but do not preclude the presence or addition of one or more other features, steps, operations, elements, components, and/or groups. It will be understood that, when an element, such as a layer, a film, a region, or a substrate, is referred to as being placed “on” another element, it can be directly placed on the other element, or intervening layer(s) may also be present. In addition, when an element, such as a layer, a film, a region, or a substrate, is referred to as being formed “on” another element, a direction in which the element is formed on the other element is not limited to an upward direction and includes a lateral direction or a downward direction. On the contrary, when an element, such as a layer, a film, a region, or a substrate, is referred to as being placed "under" another element, it can be directly placed under the other element, or intervening layer(s) may also be present.

Hereinafter, embodiments of the present disclosure will be described in detail with reference to the accompanying drawings.

According to one embodiment, both high beam and low beam may be realized using a first light source, a second light source, and a reflector. As a result, a lighting apparatus can have a small size and a high degree of design freedom through simplification of a structure thereof.

Figure 2:
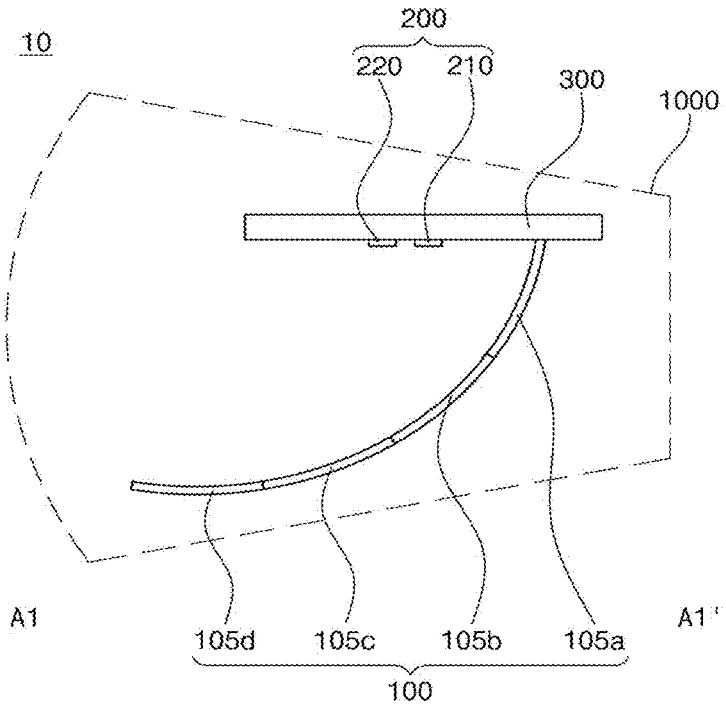
FIG. 2 is a sectional view of the lighting apparatus taken along line A1-A1' of FIG. 1.

FIG. 1 is a perspective view of a lighting apparatus according to one embodiment of the present disclosure and FIG. 2 is a sectional view of the lighting apparatus taken along line A1-A1' of FIG. 1.

Referring to FIG. 1, a lighting apparatus 10 includes a reflector 100, a light source unit 200, and a support 300.

The light source unit 200 emits light towards the reflector 100. The light emitted from the light source unit 200 may be reflected from the reflector 100 to be discharged from the lighting apparatus.

The reflector 100 reflects the light emitted from the light source unit 200 to be discharged from the lighting apparatus 10. Accordingly, the reflector 100 is separated from the light source unit 200 and may have a curved surface which reflects the light emitted from the light source unit 200 to be discharged from the lighting apparatus. Specifically, the reflector 100 may have a curved surface that makes light travel towards a predetermined region according to an illumination pattern for high beam and low beam.

The reflector 100 may include a reflective layer and a reflector matrix. The reflector matrix may have a curved surface facing the light source unit 200 and may have mechanical strength to resist deformation due to external impact. For example, the reflector matrix may include at least one selected from the group consisting of polyethylene, polypropylene, polyvinyl chloride, polystyrene, ABS (acrylonitrile-butadiene-styrene) resin, methacrylate resin, polyamide, polycarbonate, polyacetyl, polyethylene terephthalate, modified polyphenylene oxide (modified PPO), polybutylene terephthalate, polyurethane, phenolic resin, urea resin, melamine resin, and combinations thereof.

In the reflector 100, the reflective layer may be formed on the reflector matrix and may reflect light without loss. For example, the reflective layer may reflect light in the visible spectrum without loss among light emitted from the light source unit 200. To this end, the reflective layer may include a metal, such as silver (Ag), aluminum (Al), copper (Cu), platinum (Pt), chromium (Cr), gold (Au), and the like, and may further include a thin film coated thereon to improve reliability and heat resistance of the reflective layer while preventing the reflective layer from being peeled off.

The reflector 100 may include multiple reflective plates 105*a*, 105*b*, 105*c*, 105*d* continuously arranged. In the reflector 100, the reflective plates 105*a*, 105*b*, 105*c*, 105*d* may have reflective surfaces with different shapes such that the light emitted from the light source unit 200 can travel towards different regions outside the lighting apparatus 10. For example, the reflective plates 105*a*, 105*b*, 105*c*, 105*d* may have an aspherical shape and may be divided from each other at points where the aspherical shapes of the reflective plates 105*a*, 105*b*, 105*c*, 105*d* are changed. Details of the reflective plates 105*a*, 105*b*, 105*c*, 105*d* will be described below.

The light source unit 200 emits light towards the reflector 100 and includes a first light source 210 and a second light source 220 to emit light in the visible spectrum.

In the light source unit 200, the first light source 210 and the second light source 220 are separated from each other. Further, the first light source 210 and the second light source 220 may be independently controlled. For example, the first light source 210 may be operated to provide low beam and at least the second light source 220 may be operated to provide high beam.

The first light source 210 and the second light source 220 may be separated from each other on the same surface of the support 300. Since the first light source 210 and the second light source 220 are separated from each other, different regions may be illuminated with light emitted from the first light source 210 and light emitted from the second light source 220, respectively.

As the first light source 210 and the second light source 220 are placed at different locations, the first light source 210 and the second light source 220 may provide different optical paths along which light enters the reflector 100 and is reflected therefrom, and different illumination regions illuminated with light reflected from the reflector 100. Light emitted from the first light source 210 may be reflected from the reflector 100 to reach an illumination region for realizing low beam, and light emitted from the second light source 220 may be reflected from the reflector 100 to reach an illumination region for realizing high beam.

Both high beam and low beam may be realized using the first light source 210, the second light source 220, and the reflector 100 separated from the light source unit 200. Accordingly, separate implementation of a lighting apparatus for realizing high beam and a lighting apparatus for realizing low beam may not be needed. As a result, the lighting apparatus according to the embodiment can have a very simple structure and a compact size.

Each of the first light source 210 and the second light source 220 may be a light emitting diode. For example, the first light source 210 and the second light source 220 may be flip-chip type light emitting diodes. In this case, each of the first light source 210 and the second light source 220 may include a plurality of conductivity type semiconductor layers, an active layer, and a contact layer. In each of the first light source 210 and the second light source 220, the active layer may have a single-quantum well structure or a multi-quantum well structure, and the composition of nitride semiconductors in the active layer may be adjusted to emit light in a predetermined wavelength band.

The first light source 210 and the second light source 220 may emit light in the visible spectrum, as described above. For example, light emitted from the first light source 210 and the second light source 220 may have a wavelength in the range of about 380 nm to about 770 nm. As the first light source 210 and the second light source 220 emit light in this wavelength band, a driver can recognize light emitted from the first light source 210 and the second light source 220 with the naked eye.

The first light source 210 and the second light source 220 are disposed on the support 300. The support 300 may have a plate shape and may support the light source unit 200 on one surface thereof, as shown in FIG. 2. The shape of the support 300 may be changed depending on the shape of the lighting apparatus. For example, the support 300 may have a trapezoidal shape, a rectangular shape, a square shape, an elliptical shape, or a circular shape in plan view.

The support 300 may be disposed to face the reflector 100. For example, at least one end of the reflector 100 having a curved surface may disposed to face the support 300. The other end of the reflector 100 may be supported by the support 300.

The support 300 may include a circuit board for mounting the first light source 210 and the second light source 220. In some embodiments, the support 300 does not include the circuit board and the light source unit 200 may include a separate circuit board.

The support 300 supports the light source unit 200. The support 300 may also support the reflector 100. The light source unit 200 and the reflector 100 may be disposed on the same surface of the support 300 and be supported thereby.

The support 300 may further include a heat dissipation member. The heat dissipation member may be realized in various forms and may remove heat from the light source unit 200. For example, the heat dissipation member may be a thermally conductive member that connects the light source unit 200 to an external component or may be provided in the form of a pipe or a duct that exposes some region of the light source unit 200.

The lighting apparatus 10 may further include a housing 1000. The housing 1000 may cover the reflector 100, the light source unit 200, and the support 300. The housing 1000 may have a shape and material that delivers light, which is emitted from the light source unit 200 and reflected from the reflector 100, to the outside without light loss while absorbing external impact. For example, the housing 1000 may have a light exit surface, which may be optically transparent.

The lighting apparatus 10 according to the embodiment includes the first light source 210 and the second light source 220, which are separated from each other and placed on the same surface, and the reflector 100, thereby enabling implementation of high beam and low beam using a single lighting apparatus 10. Accordingly, the lighting apparatus 10 enables reduction in size thereof while improving the degree of design freedom.

In the above, the fundamental structure of the lighting apparatus 10 according to the embodiment of the present disclosure has been described. According to this embodiment, the reflector 100 may be designed to deliver light emitted from the first light source 210 and light emitted from the second light source 220 to a region for realizing high beam and a region for realizing low beam, respectively. Hereinafter, the shape of the reflector 100 for this function will be described above.

Figure 3A:
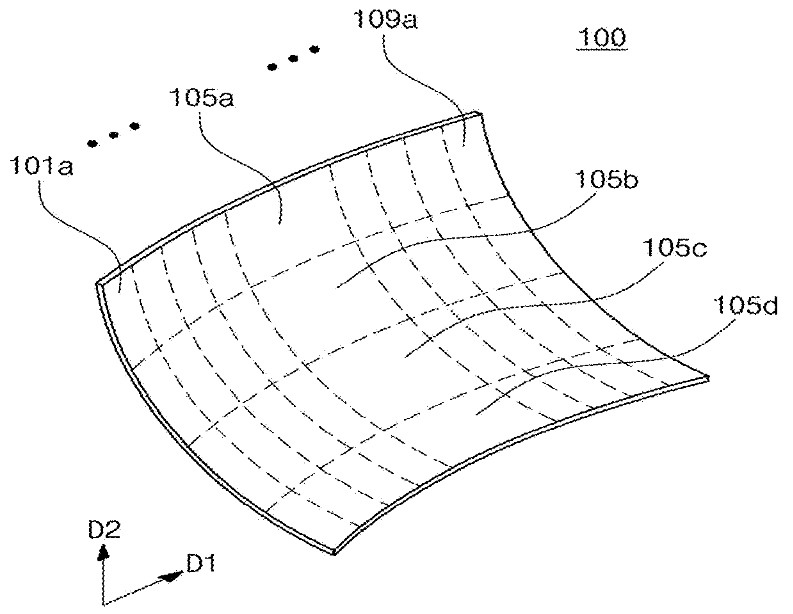
FIG. 3A is a perspective view of a reflector of the lighting apparatus according to the embodiment of the present disclosure and FIG. 3B is a plan view of the reflector shown in FIG. 3A.
Figure 3B:
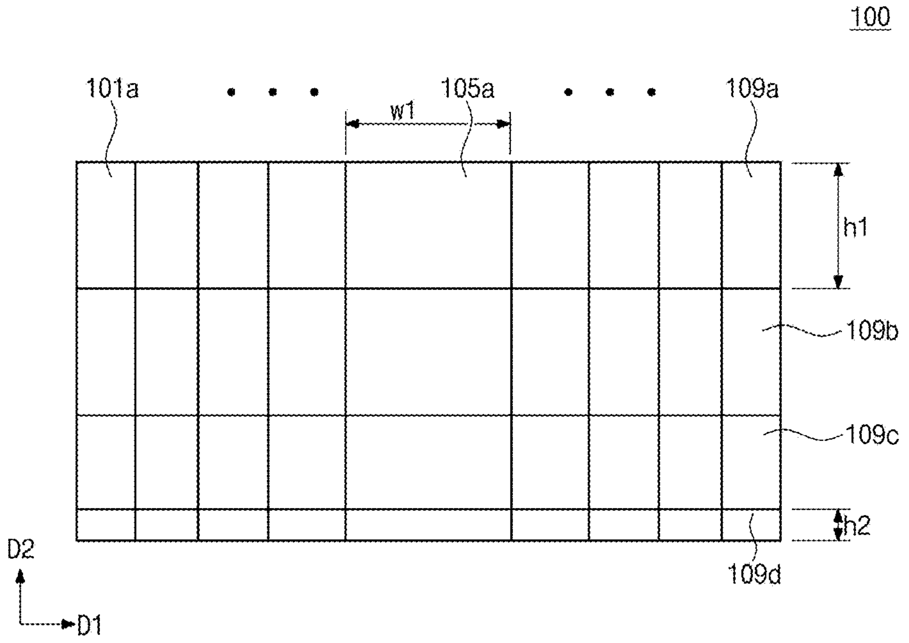

FIG. 3A is a perspective view of a reflector of the lighting apparatus according to one embodiment of the present disclosure and FIG. 3B is a plan view of the reflector shown in FIG. 3A. In this embodiment, the multiple reflective plates are arranged in a 9×4 matrix, where the multiple reflective plates are arranged along rows in the sequence of a, b, c and d and along columns in the sequence of 101, 102, . . . , and 109. For example, 102*b* means a reflector plate placed at the second row in the second column and 105*d* means a reflector plate placed at the fifth row in the fourth column.

In FIG. 3A, a first direction D1 and a second direction D2 may be determined on a plan view (FIG. 3B) of the reflector. For example, the first direction D1 may be a longitudinal direction of the reflector and the second direction D2 may be a transverse direction of the reflector in the plan view of the reflector. The first direction D1 and the second direction D2 shown in FIG. 3B may also be applied to FIG. 3A.

The reflective plates may be continuously arranged in a matrix including columns extending in the first direction D1 and rows extending in the second direction D2 perpendicular to the first direction D1. Here, the reflective plates may have different shapes depending in the columns and the rows. Specifically, the reflective plates may have different shapes and include reflective surfaces with different shapes. As a result, light reflected from the reflective plates may be delivered to different regions.

For convenience of description, the following description will focus on reflective plates 101*a* to 109*a* in the first column, reflective plates 105*a* to 105*d* in the fifth row, and reflective plates 109*a* to 109*d* in the ninth row.

The reflective plates 105*a* to 105*d* in the fifth row may be referred to as central reflective plates 105*a* to 105*d*. The central reflective plates 105*a* to 105*d* may be placed on an imaginary line extending from the first light source in the second direction D2. The central reflective plates 105*a* to 105*d* may have a larger size than other reflective plates disposed in the same column. For example, in the first column, a first central reflective plate 105*a* may have a greater width w1 than other reflective plates 101*a* to 104*a* and 106*a* to 109*a* in the first direction.

As the central reflective plates 105*a* to 105*d* has a relatively great width w1 in the first direction, light reflected from the central reflective plates 105*a* to 105*d* may travel while spreading in a horizontal direction. Furthermore, since the central reflective plates 105*a* to 105*d* are closer to the first light source and the second light source than other reflective plates, the lighting apparatus allows a relatively large quantity of light to enter and be reflected from the central reflective plates 105*a* to 105*d*. Accordingly, the lighting apparatus can illuminate a broad region with a large quantity of light through the central reflective plates 105*a* to 105*d*.

The reflective plates 101*a* to 109*a* arranged in the first column in the first direction D1 may have a symmetrical shape with reference to the first central reflective plate 105*a* disposed in the same column. Here, the symmetrical shape includes the size of the reflective plates 101*a* to 104*a* and 106*a* to 109*a* and the shape of the reflective surfaces thereof. In particular, the reflective surfaces of the reflective plates may be linearly symmetrical with respect to a straight line passing through the center of the first central reflective plate 105*a* or a straight line extending from the first light source in the second direction D2. It should be noted that these features may also be applied to the reflective plates in other columns.

With the structure of the reflective plates 101*a* to 109*a* disposed in the first column, light emitted from the first light source or the second light source and reflected from the reflector 100 may travel in a symmetrical shape in the first direction D1. Accordingly, even when the multiple reflective plates 101*a* to 109*a* disposed in the same column have different reflective surfaces, the reflected light may travel in the symmetrical shape in the first direction D1.

The reflective plates disposed in the same row may have different shapes. For example, the reflective plates 109*a* to 109*d* disposed in the ninth row may have different shapes. Specifically, the reflective plates 109*a* to 109*d* in the same row may have a size gradually decreasing from the first light source. For example, a width h1 of the reflective plate 109*a* disposed in the ninth row and the first column may be greater than a width h2 of the reflective plate 109*d* disposed in the ninth row and the fourth column in the second direction. Since the reflective plates 109*a* to 109*d* disposed in the same row have different shapes as described above, the reflective plates 109*a* to 109*d* may emit different quantities of light towards different regions. For example, since the reflective plate 109*a* disposed in the ninth row and the first column has a relatively great width h1 in the second direction and is placed relatively close to the first light source and the second light source, the reflective plate 109*a* disposed in the ninth row and the first column can reflect a greater quantity of light towards a broader region than the reflective plate 109*d* disposed in the ninth row and the fourth column.

According to the embodiment, in the reflector 100, the multiple reflective plates have different shapes and are continuously arranged. With the aforementioned structure, both high beam and low beam can be realized by one reflector 100. With this structure, the lighting apparatus can achieve size reduction while improving the degree of design freedom.

In the above description, the shapes of the reflective plates have been described. Next, a reflection pattern of light reflected from the reflective plates will be described in more detail.

FIG. 4A to FIG. 4I are views of the reflective plates in the reflector shown in FIG. 3A and graphs depicting illumination patterns of light reflected from the reflective plates.

Referring to FIG. 4A to FIG. 4I, in the graphs depicting illumination patterns of light, the first direction of FIG. 3A and FIG. 3B may correspond to the X axis and the second direction may correspond to the Y axis. The illumination patterns of light may be obtained by calculating illumination coordinates having a first direction angle and a second direction angle on the coordinate plane including the X axis and the Y axis. The first direction angle and the second direction angle are measured with respect to a target separated a distance of 25 m from the first light source. Specifically, with respect to a foot of a vertical line on the target separated a distance of 25 m from the first light source, an angle of a line extending between a light illumination point and the first light source and an angle of a vertical line extending from the first light source may be measured and denoted by the first direction angle and the second direction, respectively. Here, the foot of the vertical line on the target separated a distance of 25 m from the first light source may be set as the origin of the coordinate plane. In addition, when the light illumination point is placed at the right of the origin, the first direction angle may be expressed as a positive value, and when the light illumination point is placed at the left of the origin, the first direction angle may be expressed as a negative value. Further, when the light illumination point is placed above the origin, the second direction angle may be expressed as a positive value, and when the light illumination point is placed below the origin, the second direction angle may be expressed as a negative value.

Further, in the graphs of FIG. 4A to FIG. 4I, a region indicated by a red color means a region on which light is focused, and a lesser quantity of light is indicated by a blue color or a dark blue color.

Figure 4A:
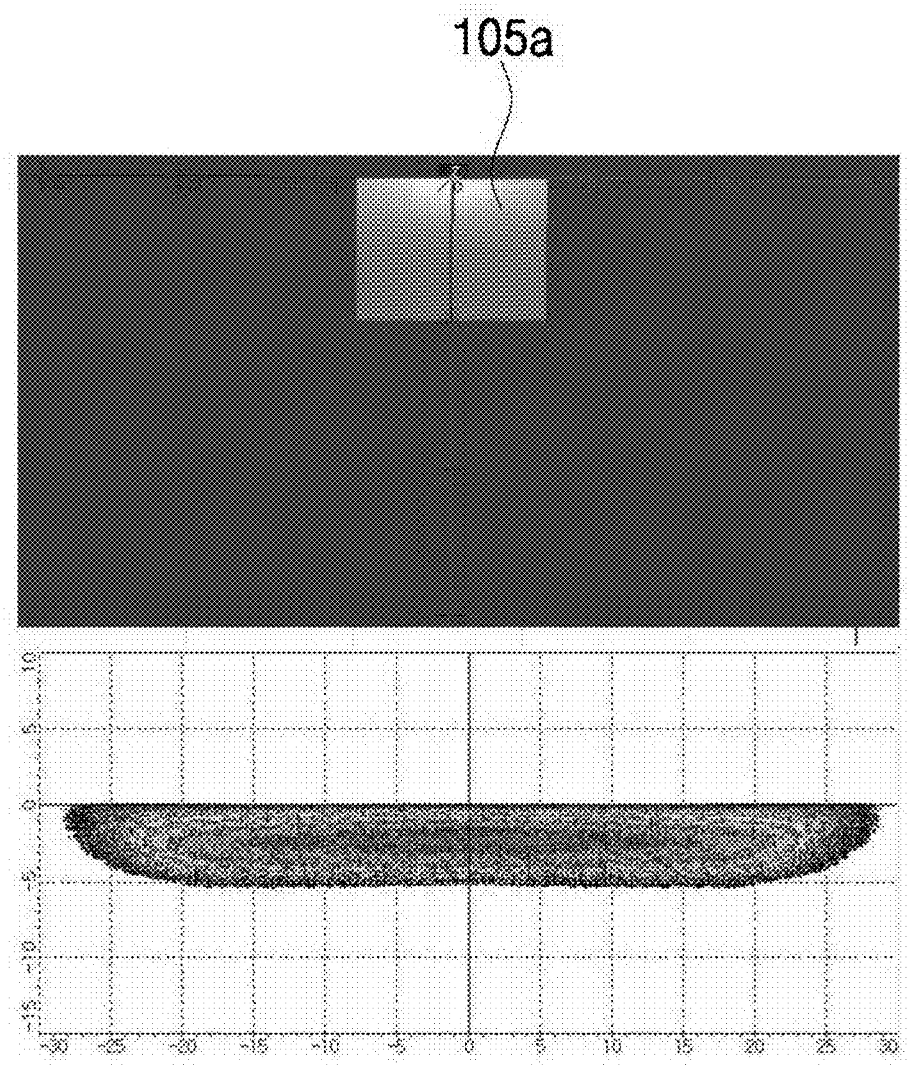
FIG. 4A to FIG. 4I are views of reflective plates in the reflector shown in FIG. 3A and graphs depicting illumination patterns of light reflected from the reflective plates, where.

Referring to FIG. 4A, the shape of the first central reflective plate 105*a* in the first column of the reflector and an illumination pattern of light reflected from the first central reflective plate 105*a* can be confirmed. The first central reflective plate 105*a* has a greater width than other reflective plates in the first direction. Accordingly, the first central reflective plate 105*a* may reflect light to a broader region than other reflective plates.

On the coordinate plane consisting of the first direction (X axis direction) and the second direction (Y axis direction), a region in the range of about −25 degrees to about +25 degrees in the first direction may be illuminated with light reflected from the first central reflective plate 105*a*. In the second direction, a region of about 0 degree or less may be illuminated with the light reflected from the first central reflective plate 105*a*. For example, a region in the range of about 0 degree to about −5 degrees in the second direction may be illuminated with the light reflected from the first central reflective plate 105*a*.

Since the first central reflective plate 105*a* is placed relatively close to the light source unit, the first central reflective plate 105*a* may receive a greater quantity of light than other reflective plates 101*a* to 104*a*, 106*a* to 109*a* in the same column as the first central reflective plate 105*a*. As the first central reflective plate 105*a* receiving a greater quantity of light reflects the light towards a broad region as described above, it is possible to illuminate the broad region with a large quantity of light. Accordingly, the lighting apparatus according to the present disclosure may efficiently use light emitted from the light source unit.

Figure 4B:
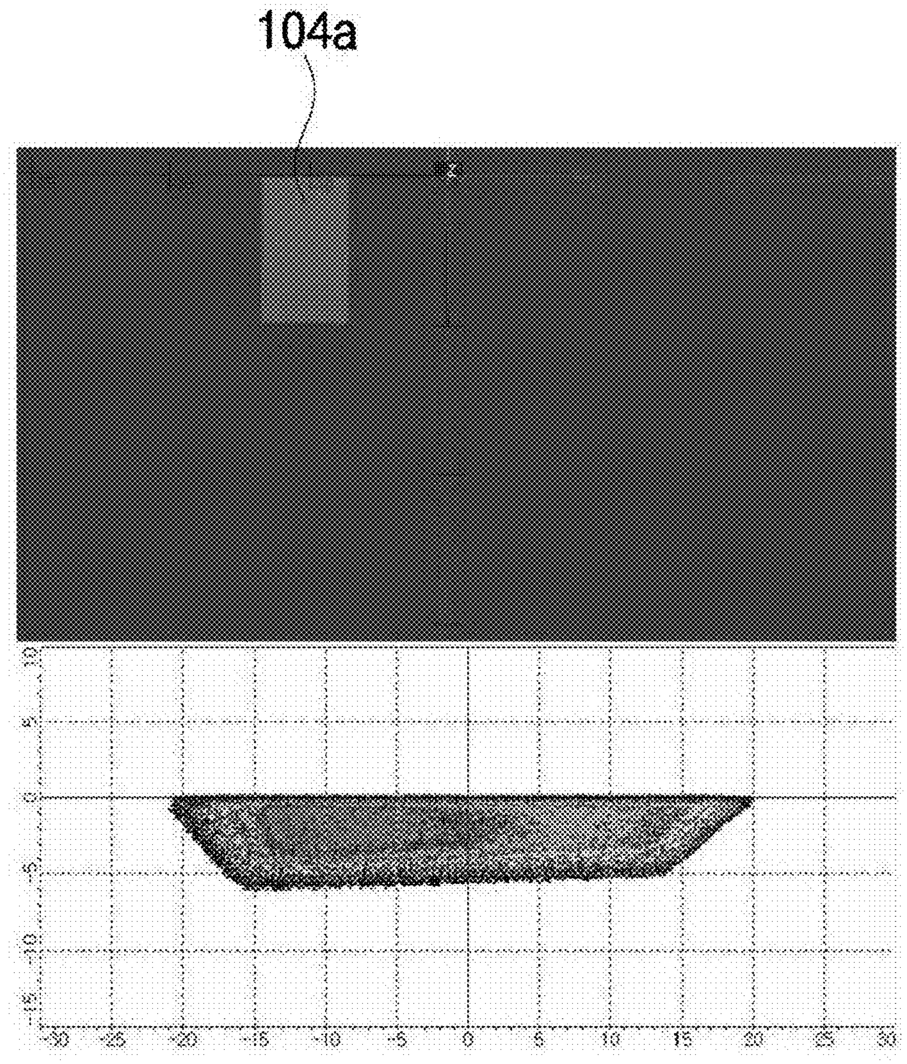
Figure 4C:
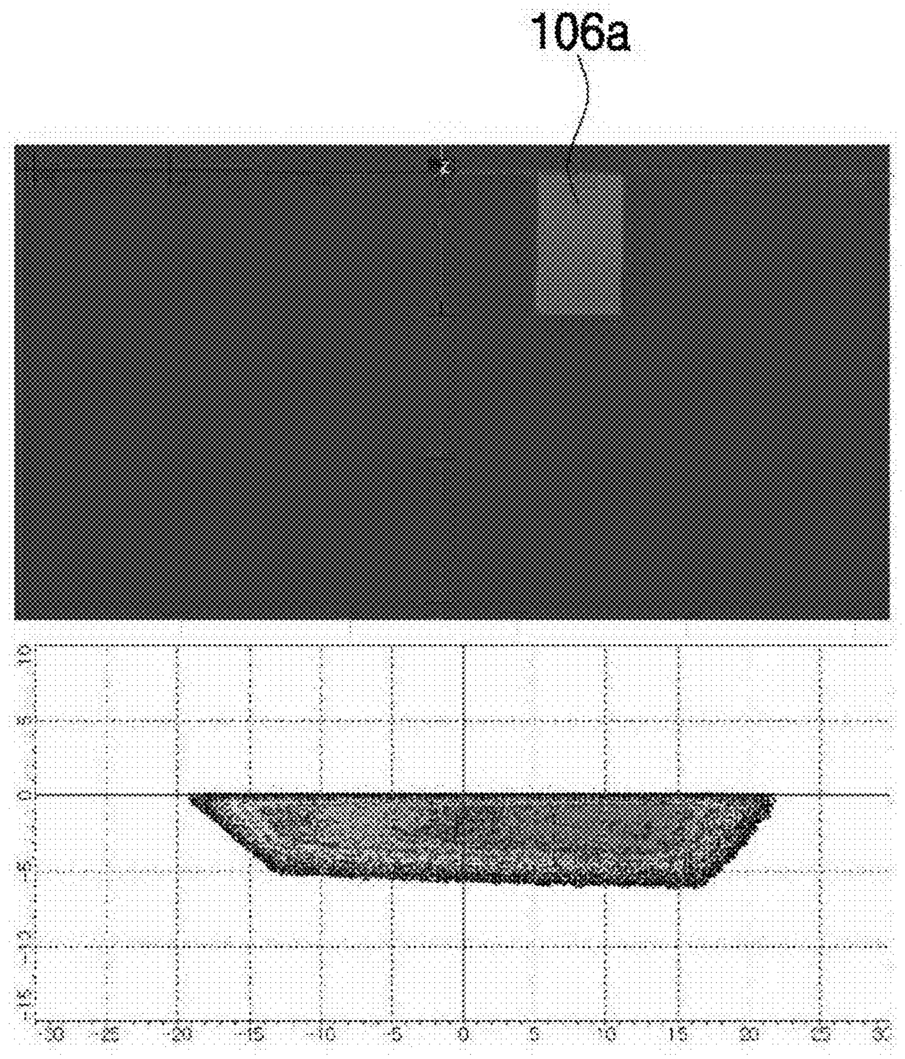

Next, referring to FIG. 4B and FIG. 4C, the shape of a fourth reflective plate 104*a* and a sixth reflective plate 106*a* in the first column of the reflector and an illumination pattern of light reflected from the fourth reflective plate 104*a* and the sixth reflective plate 106*a* will be described.

The fourth reflective plate 104*a* and the sixth reflective plate 106*a* are disposed near the first central reflective plate 105*a* in the first direction. The fourth reflective plate 104*a* and the sixth reflective plate 106*a* may have a smaller width than the first central reflective plate 105*a* in the first direction. Accordingly, light reflected from the fourth reflective plate 104*a* and the sixth reflective plate 106*a* may reach a narrower region than light reflected from the first central reflective plate 105*a* in the first direction. For example, a region in the range of about −20 degrees to about 20 degrees in the first direction may be illuminated with the light reflected from the fourth reflective plate 104*a* and the sixth reflective plate 106*a*.

The fourth reflective plate 104*a* and the sixth reflective plate 106*a* may have a symmetrical shape with reference to the first central reflective plate 105*a*. Specifically, the sizes of the fourth reflective plate 104*a* and the sixth reflective plate 106*a* and the shapes of the reflective surfaces thereof may be linearly symmetric with respect to the first central reflective plate 105*a*. Accordingly, a region illuminated with the light reflected from the fourth reflective plate 104*a* and the sixth reflective plate 106*a* may have a linearly symmetrical shape with reference to the second direction axis. Here, it should be noted that a region at the left of the second direction axis may be illuminated with a relatively large quantity of light reflected from the fourth reflective plate 104*a* disposed at the left of the first central reflective plate 105*a* and a region at the right of the second direction axis may be illuminated with a relatively large quantity of light reflected from the sixth reflective plate 106*a* disposed at the right of the first central reflective plate 105*a*.

Since the fourth reflective plate 104*a* and the sixth reflective plate 106*a* have a symmetrical shape with reference to the first central reflective plate 105*a*, a central region in which the first direction axis intersects with the second direction axis may be illuminated with a relatively large quantity of light when the light reflected from the fourth reflective plate 104*a* combines with the light reflected from the sixth reflective plate 106*a*.

Figure 4D:
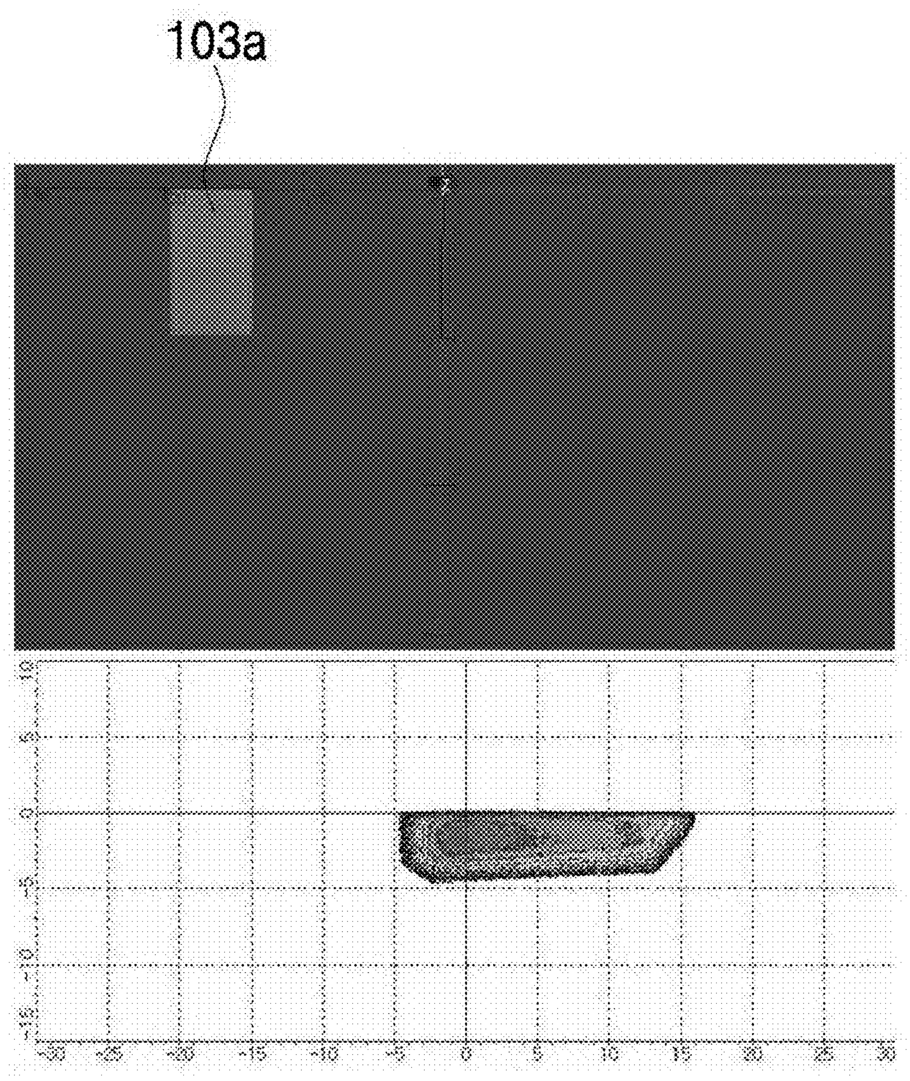
Figure 4E:
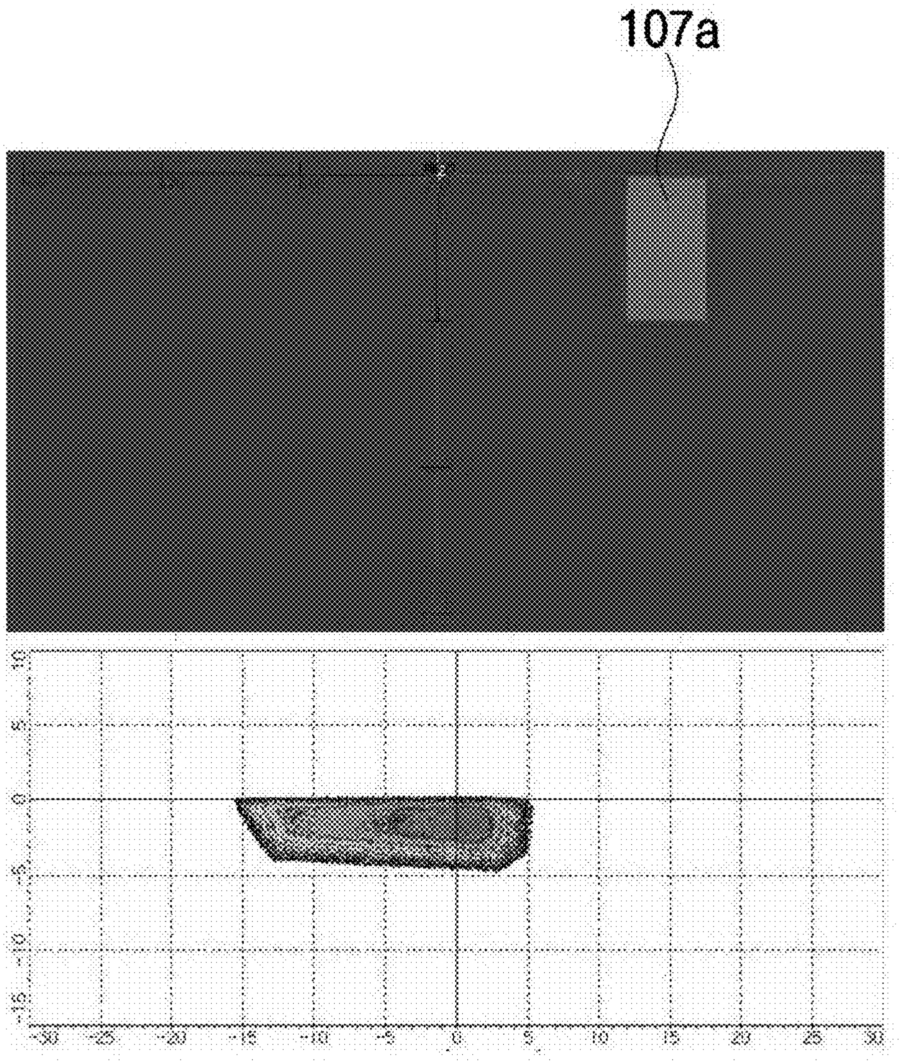

Next, referring to FIG. 4D and FIG. 4E, the shape of a third reflective plate 103*a* and a seventh reflective plate 107*a* in the first column of the reflector and an illumination pattern of light reflected from the third reflective plate 103*a* and the seventh reflective plate 107*a* will be described.

The third reflective plate 103*a* and the seventh reflective plate 107*a* are placed near the fourth reflective plate 104*a* and the sixth reflective plate 106*a* in the first direction, respectively. The third reflective plate 103*a* and the seventh reflective plate 107*a* may have smaller widths than the fourth reflective plate 104*a* and the sixth reflective plate 106*a* in the first direction, respectively. Accordingly, light reflected from the third reflective plate 103*a* and the seventh reflective plate 107*a* may reach a narrower region than light reflected from the fourth reflective plate 104*a* and the sixth reflective plate 106*a* in the first direction. For example, a region in the range of about −5 degrees to about 15 degrees in the first direction may be illuminated with the light reflected from the third reflective plate 103*a* and a region in the range of about −15 degrees to about 5 degrees in the first direction may be illuminated with the light reflected from the seventh reflective plate 107*a*.

The third reflective plate 103*a* and the seventh reflective plate 107*a* may have a linearly symmetrical shape with reference to the first central reflective plate 105*a*. Specifically, the sizes of the third reflective plate 103*a* and the seventh reflective plate 107*a* and the shapes of the reflective surfaces thereof may be linearly symmetric with respect to the first central reflective plate 105*a*. Accordingly, a region illuminated with the light reflected from the third reflective plate 103*a* and the seventh reflective plate 107*a* may have a linearly symmetrical shape with reference to the second direction axis. Here, it should be noted that a region at the left of the second direction axis may be illuminated with a relatively large quantity of light reflected from the third reflective plate 103*a* disposed at the left of the first central reflective plate 105*a* and a region at the right of the second direction axis may be illuminated with a relatively large quantity of light reflected from the seventh reflective plate 107*a* disposed at the right of the first central reflective plate 105*a*.

The light reflected from the third reflective plate 103*a* and the seventh reflective plate 107*a* may focus on a central region in which the first direction axis intersects with the second direction axis. For example, the third reflective plate 103*a* and the seventh reflective plate 107*a* may have a parabolic shape having a focal point in a central region thereof to deliver light as described above. Although the third reflective plate 103*a* and the seventh reflective plate 107*a* have relatively small sizes and are relatively farther away from the light source unit, the third reflective plate 103*a* and the seventh reflective plate 107*a* serve to focus light on the central region, thereby improving illumination efficiency of the lighting apparatus.

Figure 4F:
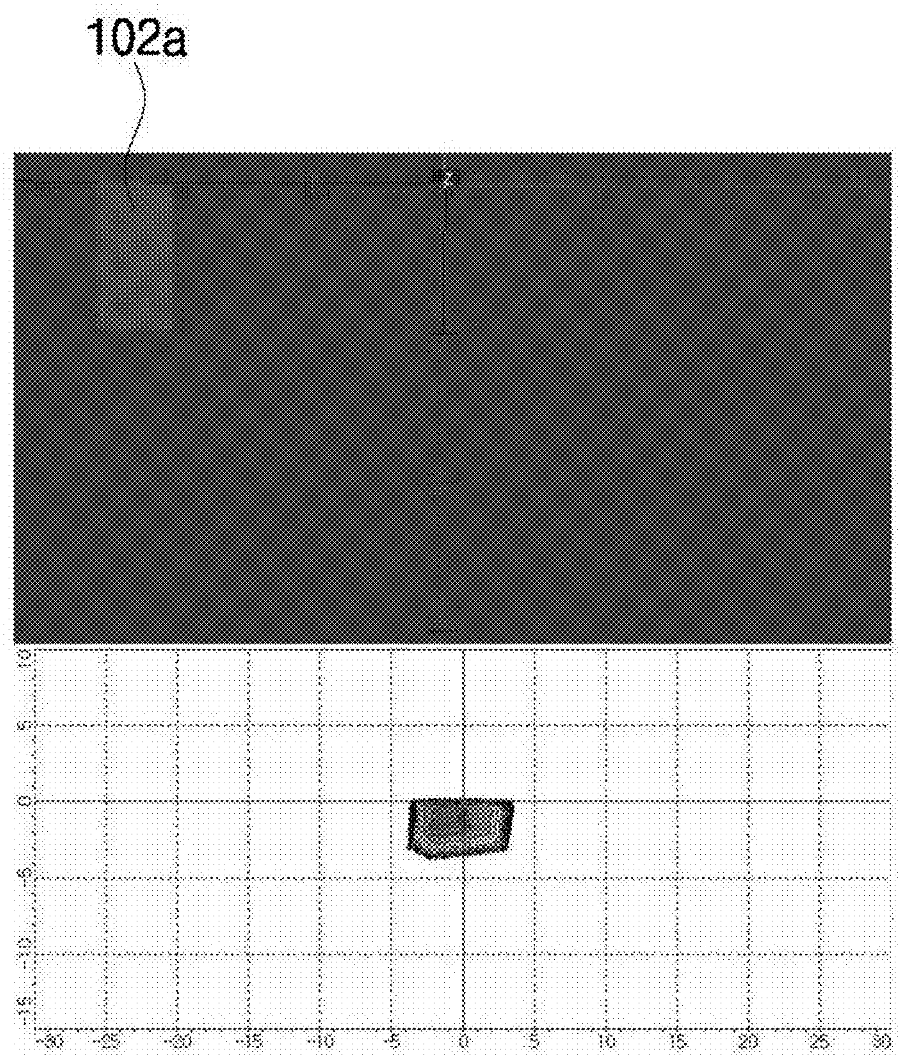
Figure 4G:
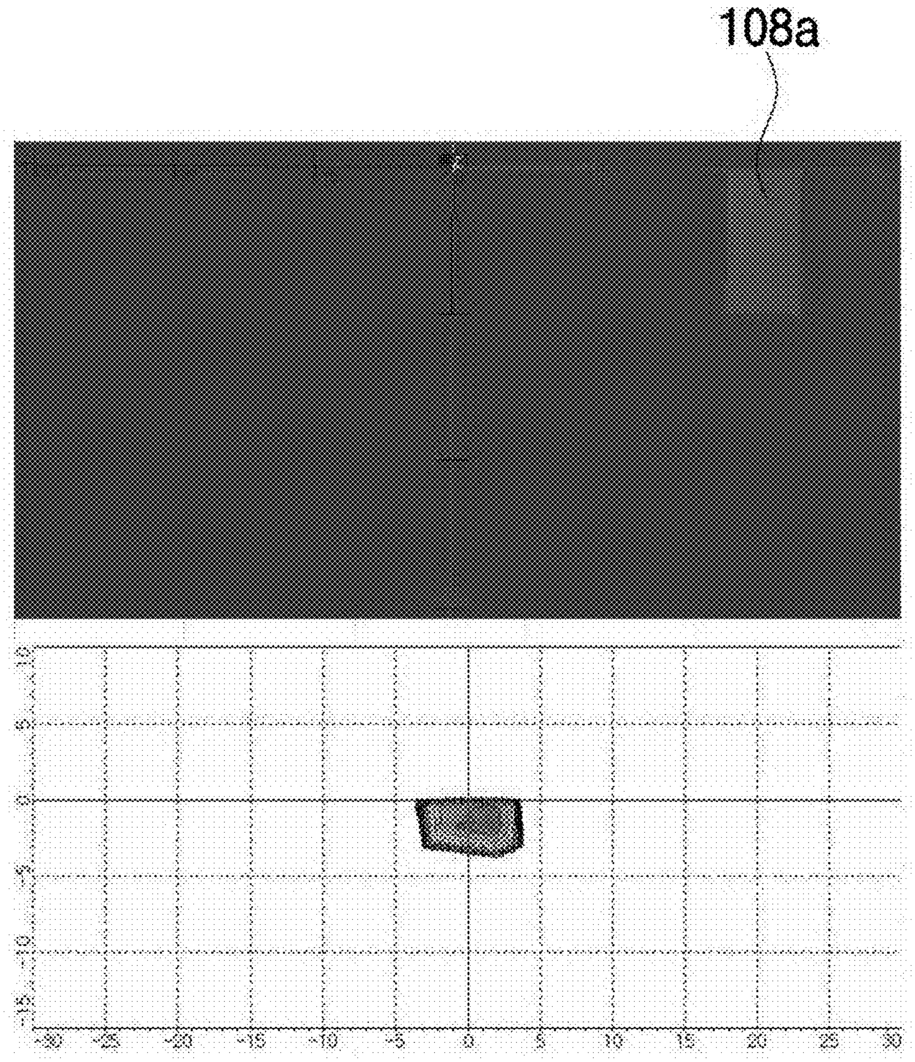

Next, referring to FIG. 4F and FIG. 4G, the shape of a second reflective plate 102*a* and an eighth reflective plate 108*a* in the first column of the reflector and an illumination pattern of light reflected from the second reflective plate 102*a* and the eighth reflective plate 108*a* will be described.

The second reflective plate 102*a* and the eighth reflective plate 108*a* are placed near the third reflective plate 103*a* and the seventh reflective plate 107*a* in the first direction, respectively. The second reflective plate 102*a* and the eighth reflective plate 108*a* may have smaller widths than the third reflective plate 103*a* and the seventh reflective plate 107*a* in the first direction, respectively. Accordingly, light reflected from the second reflective plate 102*a* and the eighth reflective plate 108*a* may reach a narrower region than light reflected from the third reflective plate 103*a* and the seventh reflective plate 107*a* in the first direction. For example, a region in the range of about −3 degrees to about 3 degrees in the first direction may be illuminated with the light reflected from the second reflective plate 102*a* and the eighth reflective plate 108*a*.

The second reflective plate 102*a* and the eighth reflective plate 108*a* may have a linearly symmetrical shape with reference to the first central reflective plate 105*a*. Specifically, the sizes of the second reflective plate 102*a* and the eighth reflective plate 108*a* and the shapes of the reflective surfaces thereof may be linearly symmetric with respect to the first central reflective plate 105*a*. Accordingly, a region illuminated with the light reflected from the second reflective plate 102*a* and the eighth reflective plate 108*a* may have a linearly symmetrical shape with reference to the second direction axis. Here, it should be noted that a region at the left of the second direction axis may be illuminated with a relatively large quantity of light reflected from the second reflective plate 102*a* disposed at the left of the first central reflective plate 105*a* and a region at the right of the second direction axis may be illuminated with a relatively large quantity of light reflected from the eighth reflective plate 108*a* disposed at the right of the first central reflective plate 105*a*.

The light reflected from the second reflective plate 102*a* and the eighth reflective plate 108*a* may focus on the central region in which the first direction axis intersects with the second direction axis. For example, the second reflective plate 102*a* and the eighth reflective plate 108*a* may have a parabolic shape having a focal point in a central region thereof to deliver light as described above. Although the second reflective plate 102*a* and the eighth reflective plate 108*a* have relatively small sizes and are relatively farther away from the light source unit, the second reflective plate 102*a* and the eighth reflective plate 108*a* serve to focus light on the central region, thereby improving illumination efficiency of the lighting apparatus.

Figure 4H:
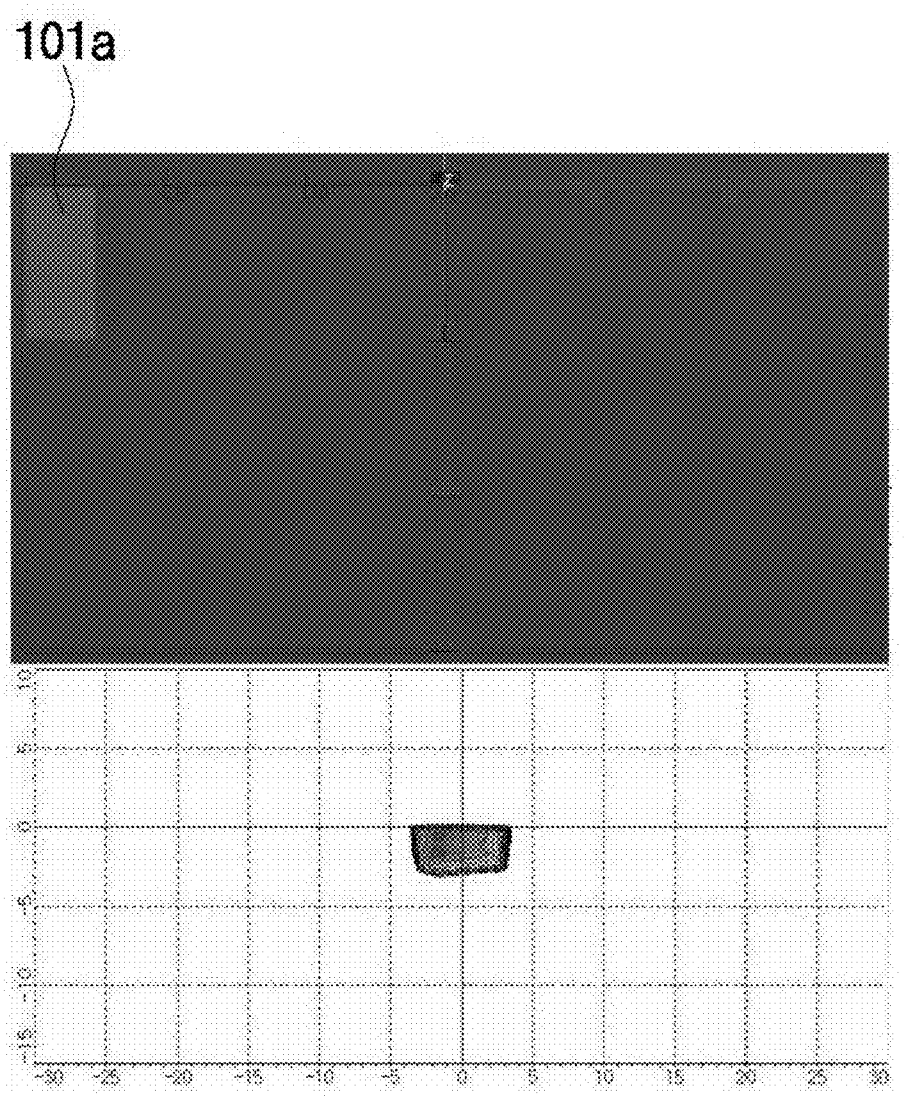
Figure 4I:
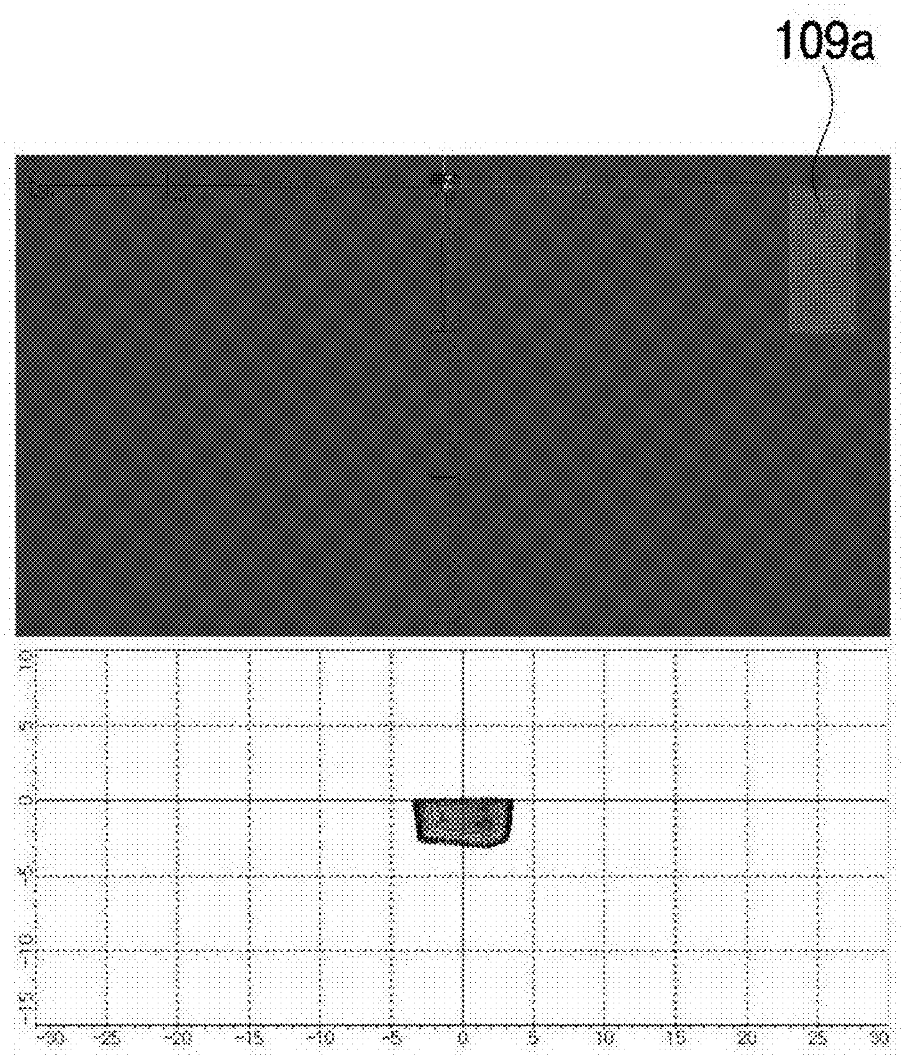

Next, referring to FIG. 4H and FIG. 4I, the shape of a first reflective plate 101*a* and a ninth reflective plate 109*a* in the first column of the reflector and an illumination pattern of light reflected from the first reflective plate 101*a* and the ninth reflective plate 109*a* will be described.

The first reflective plate 101*a* and the ninth reflective plate 109*a* are disposed near the second reflective plate 102*a* and the eighth reflective plate 108*a* in the first direction, respectively. The first reflective plate 101*a* and the ninth reflective plate 109*a* may have smaller widths than the second reflective plate 102*a* and the eighth reflective plate 108*a* in the first direction, respectively. Accordingly, light reflected from the first reflective plate 101*a* and the ninth reflective plate 109*a* may reach a narrower region than light reflected from the second reflective plate 102*a* and the eighth reflective plate 108*a* in the first direction. For example, a region in the range of about −2 degrees to about 2 degrees in the first direction may be illuminated with the light reflected from the first reflective plate 101*a* and the ninth reflective plate 109*a*.

The first reflective plate 101*a* and the ninth reflective plate 109*a* may have a linearly symmetrical shape with reference to the first central reflective plate 105*a*. Specifically, the sizes of the first reflective plate 101*a* and the ninth reflective plate 109*a* and the shapes of the reflective surfaces thereof may be linearly symmetric with respect to the first central reflective plate 105*a*. Accordingly, a region illuminated with the light reflected from the first reflective plate 101*a* and the ninth reflective plate 109*a* may have a linearly symmetrical shape with reference to the second direction axis. Here, it should be noted that a region at the left of the second direction axis may be illuminated with a relatively large quantity of light reflected from the first reflective plate 101*a* disposed at the left of the first central reflective plate 105*a* and a region at the right of the second direction axis may be illuminated with a relatively large quantity of light reflected from the ninth reflective plate 109*a* disposed at the right of the first central reflective plate 105*a*.

The light reflected from the first reflective plate 101*a* and the ninth reflective plate 109*a* may focus on the central region in which the first direction axis intersects with the second direction axis. For example, the first reflective plate 101*a* and the ninth reflective plate 109*a* may have a parabolic shape having a focal point in a central region thereof to deliver light as described above. Although the first reflective plate 101*a* and the ninth reflective plate 109*a* have relatively small sizes and are relatively farther away from the light source unit, the first reflective plate 101*a* and the ninth reflective plate 109*a* serve to focus light on the central region, thereby improving illumination efficiency of the lighting apparatus.

In the above description, the first to fourth reflective plates 101*a* to 104*a*, the first central reflective plate 105*a*, and the sixth to ninth reflective plates 106*a* to 109*a* disposed in the first column have been described. In some forms, the shapes and arrangement of the reflective plates in the same column may also be applied to the reflective plates in other columns in the substantially same way or in a similar manner.

According to one embodiment, among the reflective plates disposed in the same column, some reflective plates may spread light in the first direction and some reflective plates may focus light on the central region, thereby enabling efficient redistribution of light emitted from the light source unit. As a result, the lighting apparatus adopting the reflective plates has very high illumination efficiency.

In the above description, the shapes and reflection pattern of the reflective plates disposed in the same column have been described. Next, the shapes and reflection pattern of the reflective plates disposed in the same row will be described.

FIG. 5A to FIG. 5D are views of central reflective plates in the reflector shown in FIG. 3A and graphs depicting illumination patterns of light reflected from the reflective plates.

Figure 5A:
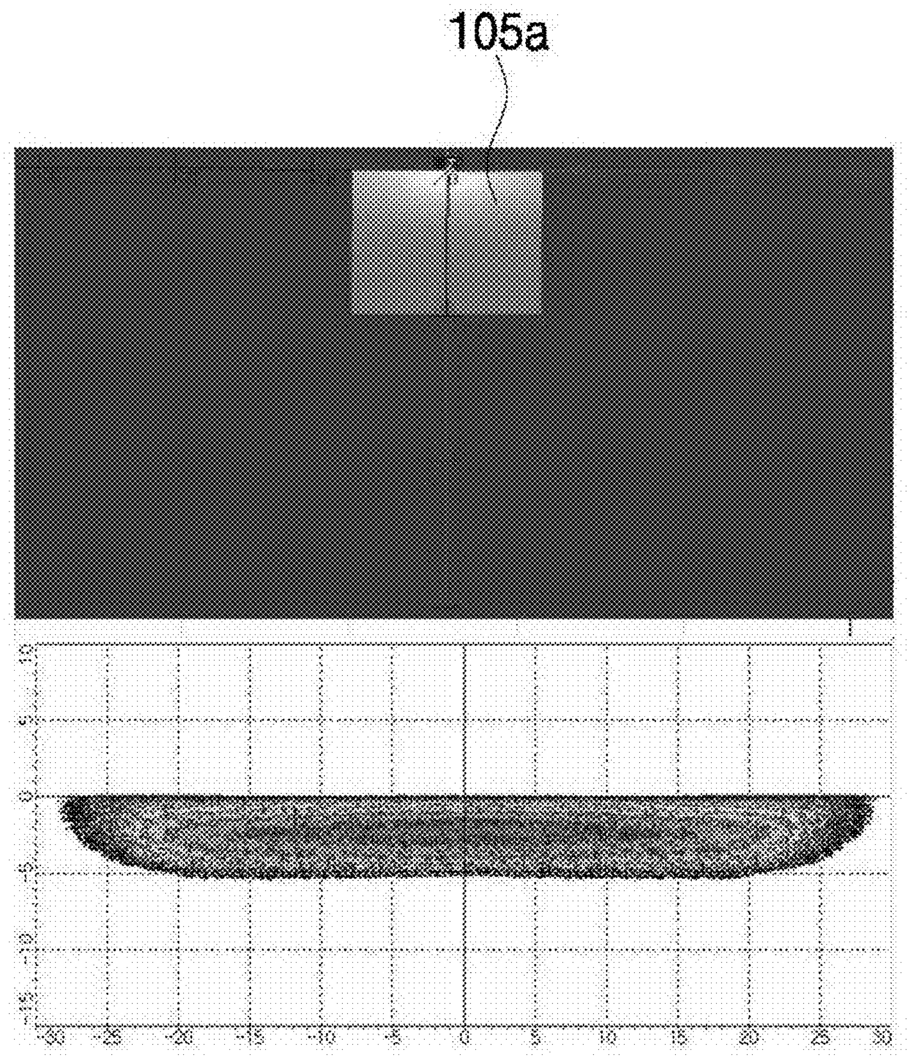
FIG. 5A to FIG. 5D are views of reflective plates in the reflector shown in FIG. 3A and graphs depicting illumination patterns of light reflected from the reflective plates, where.
Figure 5B:
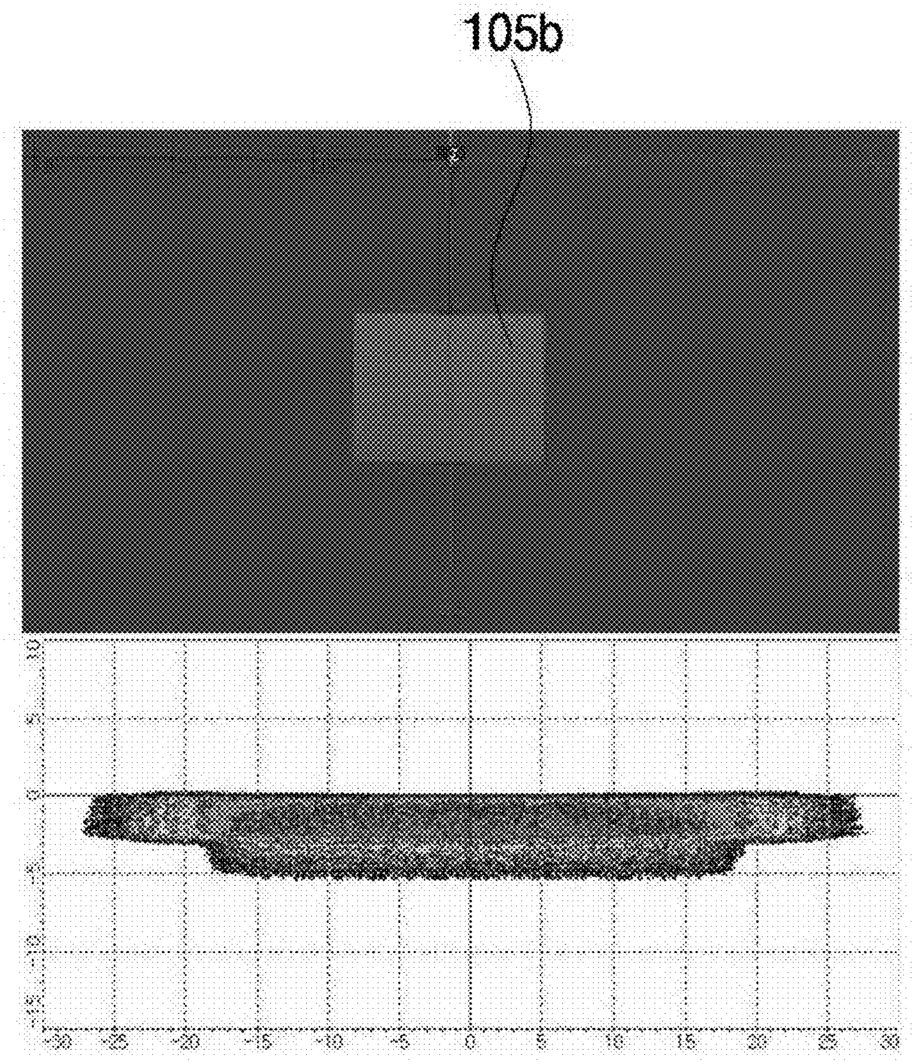
Figure 5C:
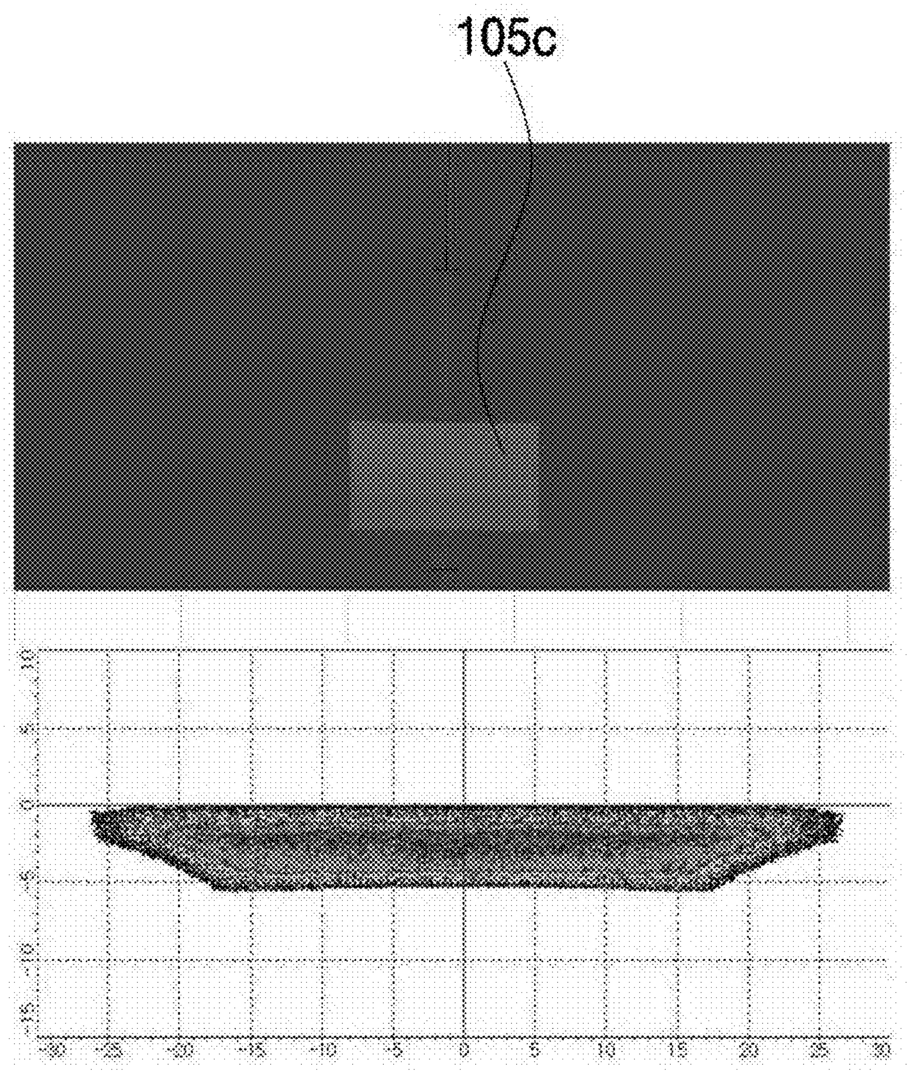
Figure 5D:
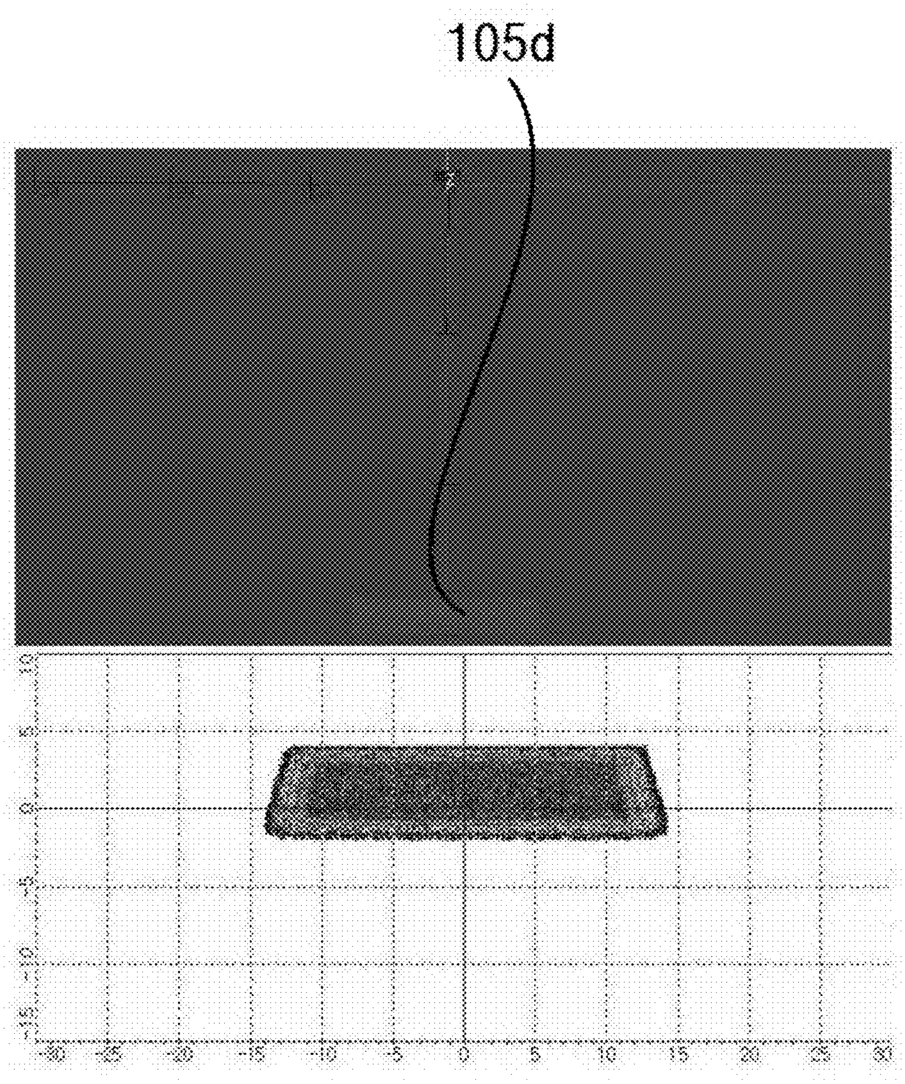

Specifically, FIG. 5A shows the shape and the reflection pattern of the first central reflective plate 105*a* disposed in the first column and FIG. 5B shows the shape and the reflection pattern of a second central reflective plate 105*b* disposed in the second column. FIG. 5C shows the shape and the reflection pattern of a third central reflective plate 105*c* disposed in the third column and FIG. 5D shows the shape and the reflection pattern of a fourth central reflective plate 105*d* disposed in the fourth column. The first to fourth central reflective plates 105*a* to 105*d* are disposed in the same row.

The first to fourth central reflective plates 105*a* to 105*d* are disposed in the same row and may have reflective surfaces with different shapes. As a result, the first to fourth central reflective plates 105*a* to 105*d* may reflect light in different ways, as shown in FIGS. 5A through 5D.

The first to fourth central reflective plates 105*a* to 105*d* may have greater widths than other reflective plates disposed in the same column in the first direction. In addition, as the first to fourth central reflective plates 105*a* to 105*d* are placed relatively close to the light source unit, the first to fourth central reflective plates 105*a* to 105*d* may reflect a large quantity of light towards a broad region.

The first to fourth central reflective plates 105*a* to 105*d* may have different widths in the first direction. For example, the first central reflective plate 105*a* closest to the light source unit may have a greater width than the second to fourth central reflective plates 105*b* to 105*d* in the first direction. Further, the fourth central reflective plate 105*d* disposed farthest from the light source unit may have a smaller width than the first to third central reflective plates 105*a* to 105*c* in the first direction.

The first to fourth central reflective plates 105*a* to 105*d* may have different widths in the second direction. For example, the first central reflective plate 105*a* may have a greater width than the second to fourth central reflective plates 105*b* to 105*d* in the second direction. In addition, the fourth reflective plate 105*d* may have a smaller width than the first to third central reflective plates 105*a* to 105*c* in the second direction.

As the first to third central reflective plates 105*a* to 105*d* have different widths in the first direction and in the second direction and are placed at different locations, the first to third central reflective plates 105*a* to 105*d* may reflect light emitted from the light source unit in different reflection patterns. For example, the first central reflective plate 105*a* may relatively evenly reflect the light to the broadest region, whereas the second and third central reflective plates 105*b*, 105*c* may reflect the light so as to focus on the central region in which the first direction axis meets the second direction axis.

The fourth central reflective plate 105*d* may reflect light towards a region of 0 degree or more in the second direction unlike the first to third central reflective plates 105*a* to 105*c*. Accordingly, upon driving on a road, a vehicle adopting the lighting apparatus according to the present disclosure can illuminate a road sign placed above the vehicle with the light reflected from the fourth central reflective plate 105*d*. In addition, the reflective plates disposed in the same column as the fourth central reflective plate 105*d* may also have a reflective surface parallel to the support in at least some region. Accordingly, at least some of light reflected from the reflective plates disposed in a column farthest from the light source unit may reach a region of about 0 degree or more in the second direction.

In the above description, the first to fourth central reflective plates 105*a* to 105*d* disposed in the same row are described. In some forms, the shapes and arrangement of the reflective plates disposed in the same row may also be applied to the reflective plates disposed in other rows in the substantially same way.

According to the embodiment, among the reflective plates disposed in the same row, some reflective plates may reflect light to a region of 0 degree or less in the second direction and some reflective plates may reflect light to a region of 0 degree or more in the second direction. Accordingly, upon driving on a road, the vehicle adopting the lighting apparatus according to the present disclosure can illuminate not only the road but also a road sign placed above the vehicle.

In the above description, the reflection pattern of each of the reflective plates in the reflector has been described. Next, an illumination pattern of combined light reflected from the reflective plates will be described.

Figure 6:
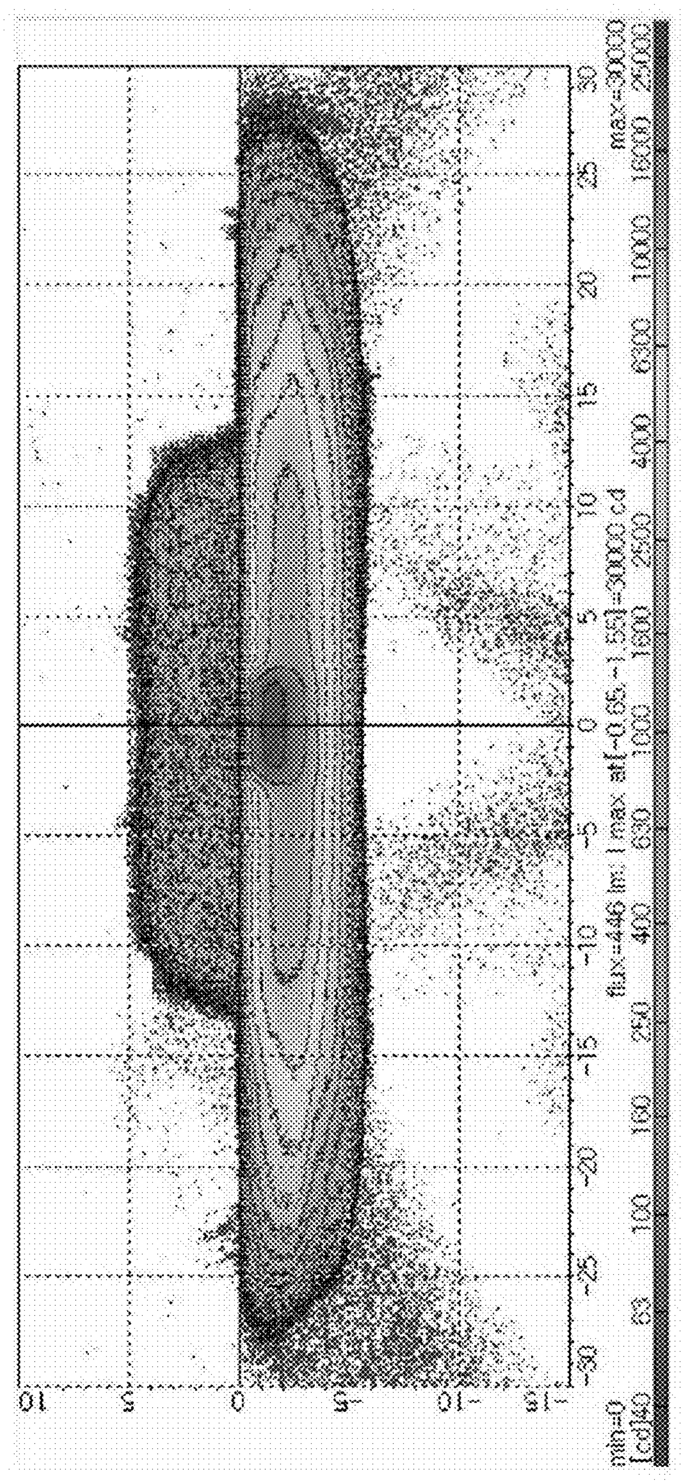
FIG. 6 is a graph depicting an illumination pattern of light reflected from the reflector shown in FIG. 3A.

FIG. 6 is a graph depicting an illumination pattern of light reflected from the reflector shown in FIG. 3A.

The reflective plates may have the reflective surfaces with different shapes depending in the columns and the rows, thereby reflecting light towards different regions. As the multiple reflective plates reflect light towards different regions, high beam or low beam may be realized through combination of light reflected from the multiple reflective plates.

Further, light reflected from the central reflective plates spreads broadly in the first direction, thereby enabling illumination without a blind spot, and light reflected from the reflective plates disposed at the right and the left of the central reflective plate is focused on the central region, thereby enabling illumination of a region in front of the vehicle adopting the lighting apparatus.

Further, the reflective plates may reflect light so as to satisfy the domestic or foreign regulations for realizing high beam and low beam.

Figure 7A:
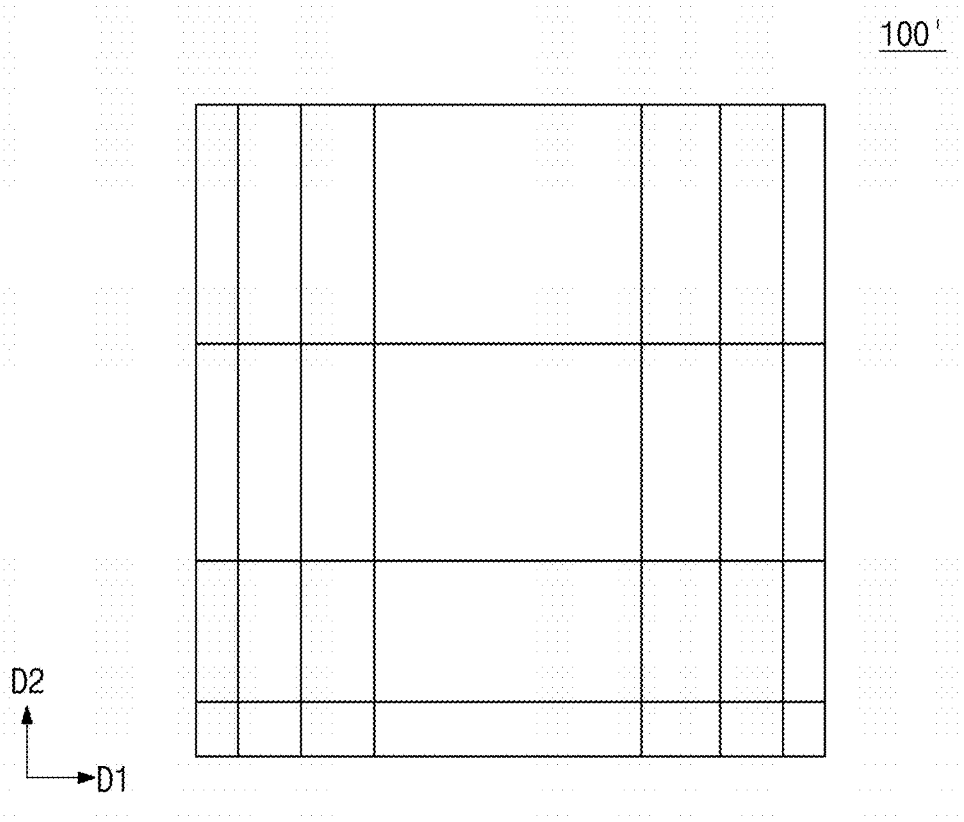
FIG. 7A is a plan view of a reflector of the lighting apparatus according to embodiments of the present disclosure.
Figure 7B:
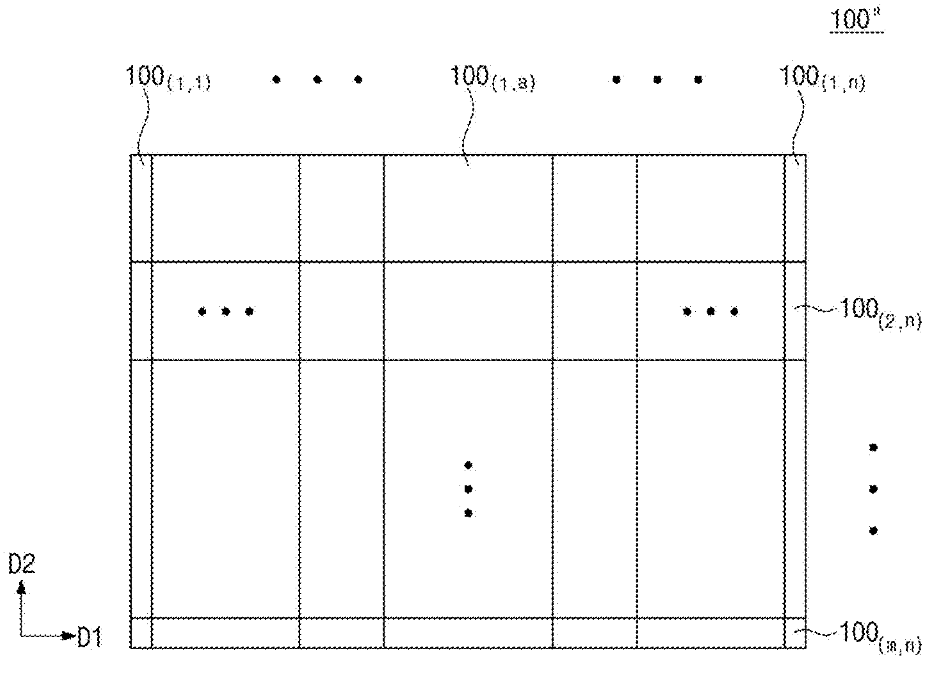
FIG. 7B is a plan view of the reflectors of the lighting apparatus according to another embodiment of the present disclosure.

FIG. 7A and FIG. 7B are plan views of reflectors of the lighting apparatus according to embodiments of the present disclosure.

Referring to FIG. 7A, a reflector 100' may have a square shape in plan view. The reflector 100' may include multiple reflective plates. Among the multiple reflective plates in the reflector 100', a reflective plate disposed closest to the light source unit may have a larger size than other reflective plates. That is, the structures of the reflective plates shown in FIG. 3A to FIG. 6 may also be applied to the reflector 100' shown in FIG. 7A.

Referring to FIG. 7B, a reflector 100" may have a rectangular shape and may include reflective plates $\mathbf{100}_{(1,1)}$ to $\mathbf{100}_{(m,n)}$ arranged in a matrix in the first direction D1 and in the second direction D2. Here, the multiple reflective plates $\mathbf{100}_{(1,1)}$ to $\mathbf{100}_{(m,n)}$ may be arranged in each of the first direction D1 and the second direction D2.

There is no limitation as to the number of reflective plates $\mathbf{100}_{(1,1)}$ to $\mathbf{100}_{(m,n)}$. For example, assuming that the column extending in the first direction D1 may be provided with n reflective plates $\mathbf{100}_{(1,1)}$ to $\mathbf{100}_{(1,n)}$, and the rows extending in the second direction D2 may be provided with m reflective plates $\mathbf{100}_{(1,n)}$ to $\mathbf{100}_{(m,n)}$, where each of n and m may be a certain natural number.

The reflective plates $\mathbf{100}_{(1,n)}$ to $\mathbf{100}_{(m,n)}$ may the same relationship therebetween as the relationship described with reference to FIG. 3A to FIG. 6. For example, the first central reflective plate $\mathbf{100}_{(1,a)}$ in the first column may have a greater width than other reflective plates $\mathbf{100}_{(1,1)}$ to $\mathbf{100}_{(m,n)}$ in the first direction. In addition, the reflective plates $\mathbf{100}_{(1,1)}$ to $\mathbf{100}_{(1,n)}$ in the first column may have a symmetrical shape with reference to the first central reflective plate $\mathbf{100}_{(1,a)}$. Here, the symmetrical shape include the shapes of the reflective plates $\mathbf{100}_{(1,1)}$ to $\mathbf{100}_{(1,n)}$ in the first column and the shapes of reflective surfaces thereof. The reflective plates disposed in the same row in the second direction may have different shapes. For example, the reflective plates $\mathbf{100}_{(1,n)}$ to $\mathbf{100}_{(m,n)}$ in the $n^{th}$ row may have different shapes. In addition, among the reflective plates $\mathbf{100}_{(1,n)}$ to $\mathbf{100}_{(m,n)}$ in the $n^{th}$ row, the reflective plate $\mathbf{100}_{(m,n)}$ in the last column may have a relatively small width in the second direction and a reflective surface parallel to the support.

Various shapes of the reflector have been described above. According to the embodiment, the reflector may be provided in various shapes. The shape of the reflector may be changed to be suitable for design of the lighting apparatus. Accordingly, it is possible to improve the degree of design freedom while improving efficiency of the lighting apparatus.

Figure 8A:
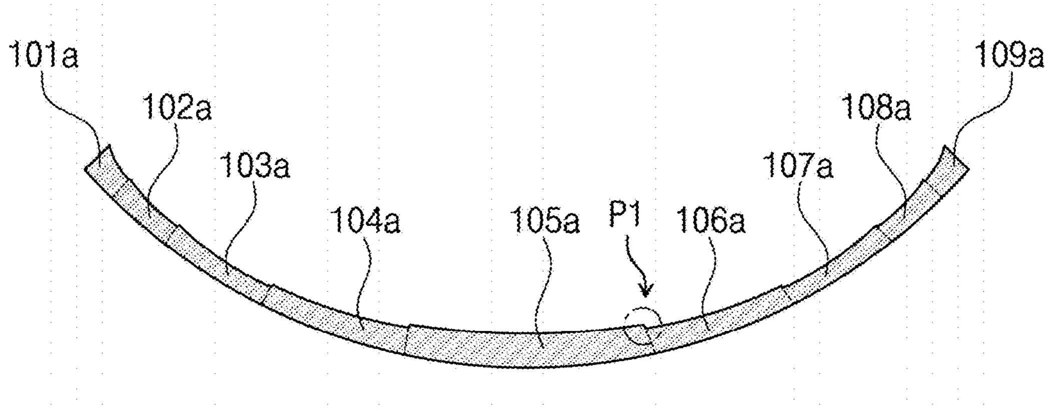
FIG. 8A is a cross-sectional view of a reflector of a lighting apparatus according to one embodiment of the present disclosure, as taken in a first direction of the reflector.
Figure 8B:
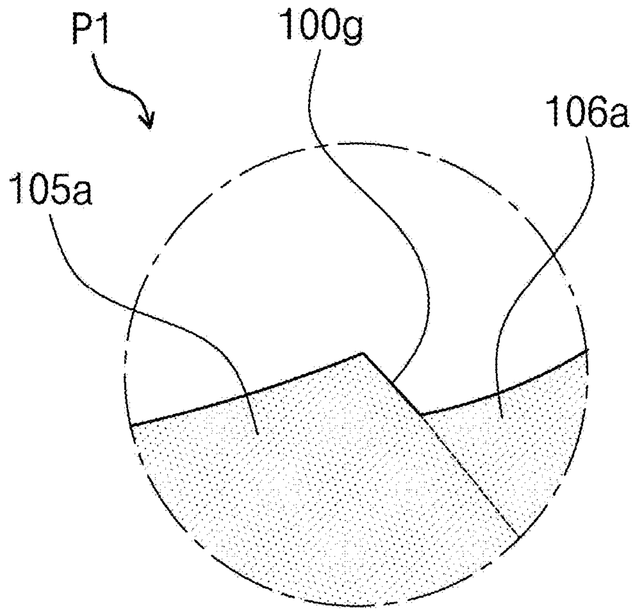
FIG. 8B is an enlarged view of Region P1 of FIG. 8A.

FIG. 8A is a cross-sectional view of a reflector of a lighting apparatus according to one embodiment of the present disclosure, as taken in the first direction of the reflector. FIG. 8B is an enlarged view of Region P1 of FIG. 8A.

Referring to FIG. 8A and FIG. 8B, the multiple reflective plates 101*a* to 109*a* may be arranged in a step shape in which distal ends of the multiple reflective plates 101*a* to 109*a* have different heights. Specifically, the multiple reflective plates 101*a* to 104*a*, 106*a* to 109*a* in the same column may be arranged in a downward step shape with reference to the first central reflective plate 105*a*.

For example, a reflective plate gap 100*g*, shown in FIG. 8B, may be disposed between the first central reflective plate 105*a* and the sixth reflective plate 106*a* at the right of the first central reflective plate 105*a*. The reflective plate gap 100*g* may be formed in a shape extending downwards from the reflective surface of the first central reflective plate 105*a*. It should be understood that a bevel surface of the reflective plate gap 100*g* is not limited to the shape shown in FIG. 8B. For example, the bevel surface of the reflective plate gap 100*g* may have a straight shape or a parabolic shape in cross-sectional view, as shown in FIG. 8B.

With the aforementioned structure of the reflective plate gap 100*g*, it is possible to prevent light emitted from the light source unit from traveling to an undesired region through reflection between the first central reflective plate 105*a* and the sixth reflective plate 106*a*.

The reflective plate gap 100*g* may be disposed not only between the first central reflective plate 105*a* and the sixth reflective plate 106*a* but also between two adjacent reflective plates. Here, the bevel surface of the reflective plate gap 100*g* may have a different shape or size.

Furthermore, the reflective plate gap 100*g* may be disposed between the reflective plates in the same row. In this embodiment, adjacent reflective plates may be provided in a downward step shape with reference to the reflective plates 101*a* to 109*a* disposed in the first column.

According to the embodiment, with the structure of the multiple reflective plates 101*a* to 109*a* including the reflective plate gap 100*g*, the lighting apparatus can prevent the light emitted from the light source unit from traveling in an undesired direction through reflection. Accordingly, the lighting apparatus can illuminate a desired region with a high ratio of light emitted from the light source unit, thereby improving illumination efficacy.

In the above description, the reflector of the lighting apparatus according to the embodiment of the present disclosure has been described in detail. Next, arrangement of the light source unit for emitting light towards the reflector will be described in detail.

Figure 9A:
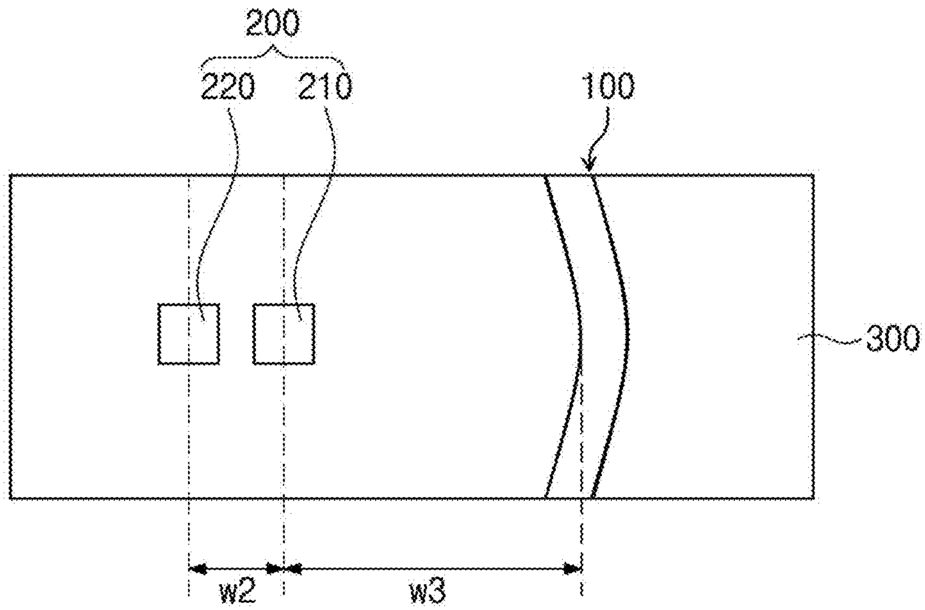
FIG. 9A is a plan view of the lighting apparatus according to the embodiment of the present disclosure and FIG. 9B is a graph depicting an illumination pattern of the lighting apparatus shown in FIG. 9A.
Figure 9B:
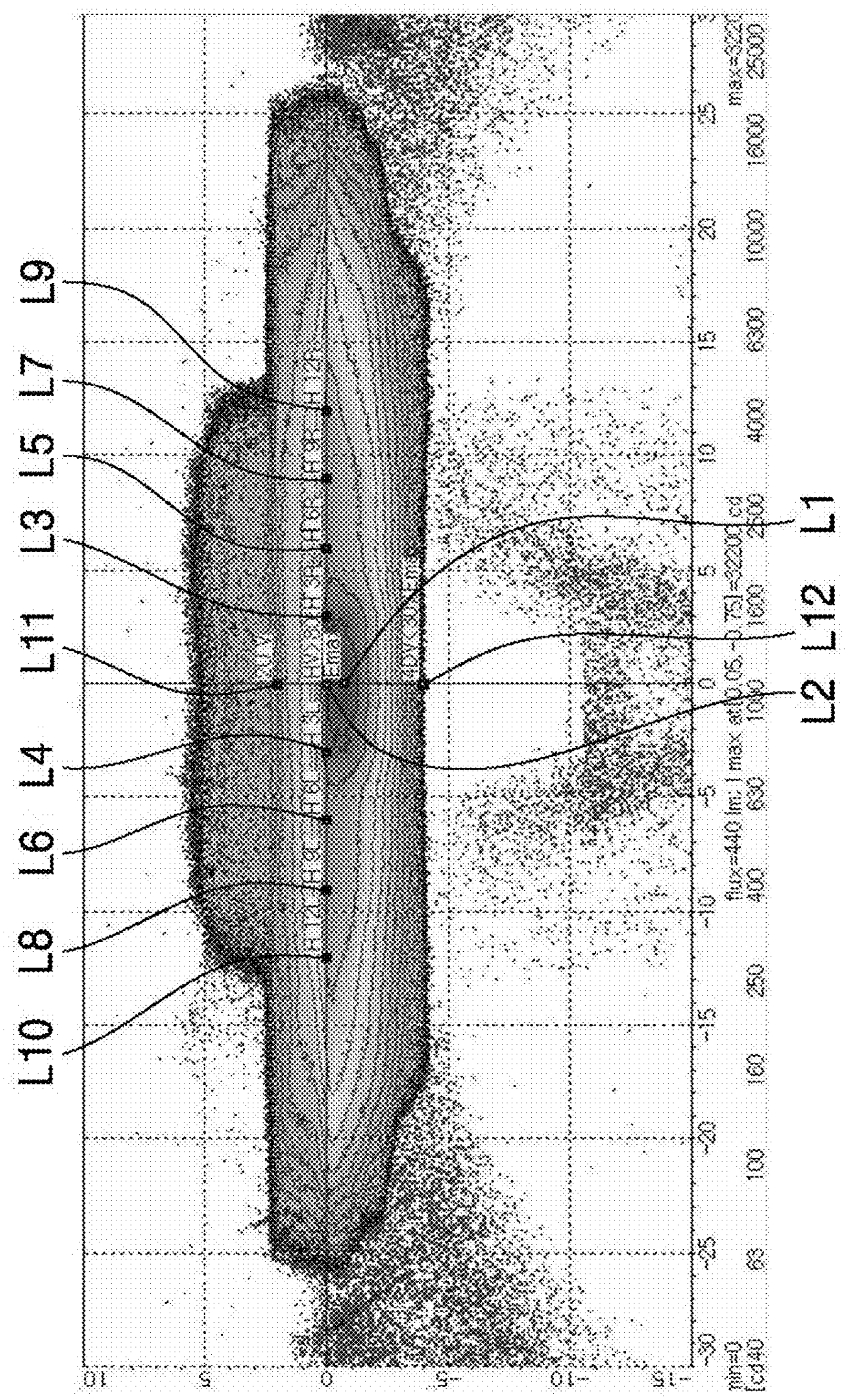

FIG. 9A is a plan view of the lighting apparatus according to the embodiment of the present disclosure and FIG. 9B is a graph depicting an illumination pattern of the lighting apparatus shown in FIG. 9A.

Referring to FIG. 9A, arrangement of the light source unit 200 will be described. FIG. 9A schematically shows a positional relationship between the light source unit 200 and the reflector 100, which may have different shapes from the support 300 and the reflector 100 of the lighting apparatus shown in FIG. 1. However, the features described with reference to FIG. 9A may be applied to the lighting apparatus shown in FIG. 1 or vice versa.

In the light source unit 200, the first light source 210 and the second light source 220 may be disposed parallel to each other on the same plane of the support 300.

The first light source 210 is separated from the second light source 220. For example, the first light source 210 may be separated from the second light source 220 by a light distribution distance w2. The light distribution distance w2 may mean a distance from the center of the first light source 210 to the center of the second light source 220, as shown in FIG. 9B. An illumination pattern may be changed depending on the light distribution distance w2 between the first light source 210 and the second light source 220.

The light distribution distance w2 may range from about 0.8 mm to about 1.2 mm. As can be seen below, when the light distribution distance w2 deviates from the above range, it is difficult to realize high beam or low beam.

Tables 1 to 5 were obtained by measuring the intensity of light on a target separated a distance of 25 m from the lighting apparatus in operation of the first light source and the second light source. For measurement, each of the first light source and the second light source emits 340 lm of light, and the reflector has a size of 60 mm (in the first direction (longitudinal direction) and 30 mm (in the second direction (transverse direction). In the following tables, the minimum intensity regulation for high beam and the maximum intensity regulation for high beam are regulation values for emission of high beam from a vehicular lighting apparatus. When the lighting apparatus fails to satisfy the minimum intensity regulation for high beam or the maximum intensity regulation for high beam, it is evaluated that high beam is not regularly operated.

TABLE 1

| | 0.7 mm | | | |
|---|---|---|---|---|
| Light distribution distance w2 Measurement point | Measured value (unit: 1x) | Minimum intensity regulation for high beam (unit: 1x) | Maximum intensity regulation for high beam (unit: 1x) | Allowable |
| L1 | 51.49 | 42.00 | 240.0 | O |
| L2 | 39.50 | 41.19 | — | X |
| L3 | 33.90 | 17.00 | — | O |
| L4 | 32.81 | 17.00 | — | O |
| L5 | 21.99 | 5.50 | — | O |
| L6 | 22.07 | 5.50 | — | O |
| L7 | 21.95 | 3.40 | — | O |
| L8 | 21.71 | 3.40 | — | O |
| L9 | 19.13 | 1.00 | — | O |
| L10 | 18.29 | 1.00 | — | O |
| L11 | 1.85 | 1.70 | — | O |
| L12 | 0.05 | — | 15.45 | O |

TABLE 2

| | 0.8 mm | | | |
|---|---|---|---|---|
| Light distribution distance w2 Measurement point | Measured value (unit: 1x) | Minimum intensity regulation for high beam (unit: 1x) | Maximum intensity regulation for high beam (unit: 1x) | Allowable |
| L1 | 49.90 | 42.00 | 240.0 | O |
| L2 | 43.45 | 41.19 | — | O |
| L3 | 37.15 | 17.00 | — | O |
| L4 | 37.00 | 17.00 | — | O |
| L5 | 23.66 | 5.50 | — | O |
| L6 | 23.46 | 5.50 | — | O |
| L7 | 22.54 | 3.40 | — | O |
| L8 | 22.68 | 3.40 | — | O |
| L9 | 19.08 | 1.00 | — | O |
| L10 | 18.34 | 1.00 | — | O |
| L11 | 4.16 | 1.70 | — | O |
| L12 | 0.00 | — | 15.45 | O |

TABLE 3

| | 1.0 mm | | | |
|---|---|---|---|---|
| Light distribution distance w2 Measurement point | Measured value (unit: 1x) | Minimum intensity regulation for high beam (unit: 1x) | Maximum intensity regulation for high beam (unit: 1x) | Allowable |
| L1 | 47.56 | 42.00 | 240.0 | O |
| L2 | 43.84 | 41.19 | — | O |
| L3 | 39.23 | 17.00 | — | O |
| L4 | 38.83 | 17.00 | — | O |

TABLE 3-continued

| | 1.0 mm | | | |
|---|---|---|---|---|
| Light distribution distance w2 Measurement point | Measured value (unit: 1x) | Minimum intensity regulation for high beam (unit: 1x) | Maximum intensity regulation for high beam (unit: 1x) | Allowable |
| L5 | 23.22 | 5.50 | — | O |
| L6 | 23.49 | 5.50 | — | O |
| L7 | 21.36 | 3.40 | — | O |
| L8 | 22.41 | 3.40 | — | O |
| L9 | 17.01 | 1.00 | — | O |
| L10 | 17.25 | 1.00 | — | O |
| L11 | 5.92 | 1.70 | — | O |
| L12 | 0.00 | — | 15.45 | O |

TABLE 4

| | 1.2 mm | | | |
|---|---|---|---|---|
| Light distribution distance w2 Measurement point | Measured value (unit: 1x) | Minimum intensity regulation for high beam (unit: 1x) | Maximum intensity regulation for high beam (unit: 1x) | Allowable |
| L1 | 42.69 | 42.00 | 240.0 | O |
| L2 | 40.73 | 41.19 | — | O |
| L3 | 38.19 | 17.00 | — | O |
| L4 | 36.22 | 17.00 | — | O |
| L5 | 23.04 | 5.50 | — | O |
| L6 | 20.82 | 5.50 | — | O |
| L7 | 19.76 | 3.40 | — | O |
| L8 | 17.40 | 3.40 | — | O |
| L9 | 14.16 | 1.00 | — | O |
| L10 | 12.86 | 1.00 | — | O |
| L11 | 10.91 | 1.70 | — | O |
| L12 | 0.00 | — | 15.45 | O |

TABLE 5

| | 1.3 mm | | | |
|---|---|---|---|---|
| Light distribution distance w2 Measurement point | Measured value (unit: 1x) | Minimum intensity regulation for high beam (unit: 1x) | Maximum intensity regulation for high beam (unit: 1x) | Allowable |
| L1 | 38.98 | 42.00 | 240.0 | X |
| L2 | 35.64 | 41.19 | — | O |
| L3 | 34.61 | 17.00 | — | O |
| L4 | 32.80 | 17.00 | — | O |
| L5 | 20.78 | 5.50 | — | O |
| L6 | 18.18 | 5.50 | — | O |
| L7 | 16.2 | 3.40 | — | O |
| L8 | 14.18 | 3.40 | — | O |
| L9 | 10.99 | 1.00 | — | O |
| L10 | 10.68 | 1.00 | — | O |
| L11 | 12.86 | 1.70 | — | O |
| L12 | 0.00 | — | 15.45 | O |

As can be seen from Tables 1 to 5, when the light distribution distance w2 ranges from about 0.8 mm to about 1.2 mm, the lighting apparatus satisfies the minimum intensity regulation for high beam and the maximum intensity regulation for high beam at all measurement points. Accordingly, in order to realize both high beam and low beam using one reflector, the first light source, and the second light source, the lighting apparatus may have a light distribution distance w2 of about 0.8 mm to about 1.2 mm.

As described above, in order to realize both high beam and low beam, the first light source 210 and the second light source 220 may be disposed in consideration of the light distribution distance w2. Here, the second light source 220 may be disposed in consideration of the light distribution distance w2 after positioning the first light source 210. Accordingly, the first light source 210 may be positioned before placement of the second light source 220.

The first light source 210 may be placed at a focal point of a curved line approaching a parabolic line corresponding to the reflector 100. For example, the first light source 210 may be separated from one end of the reflector 100, specifically from a region in which the reflector 100 meets the support 300, by a focal distance w3. The focal distance w3 may be a distance from the center of the parabolic line corresponding to the reflector 100 to the first light source 210. Here, the focal distance w3 may range from about 8 mm to about 9 mm. With the aforementioned structure of the first light source 210, the reflector 100 approaching the shape of the parabolic line has a more compact shape. As a result, the lighting apparatus including the reflector 100 can have a reduced size.

Figure 10:
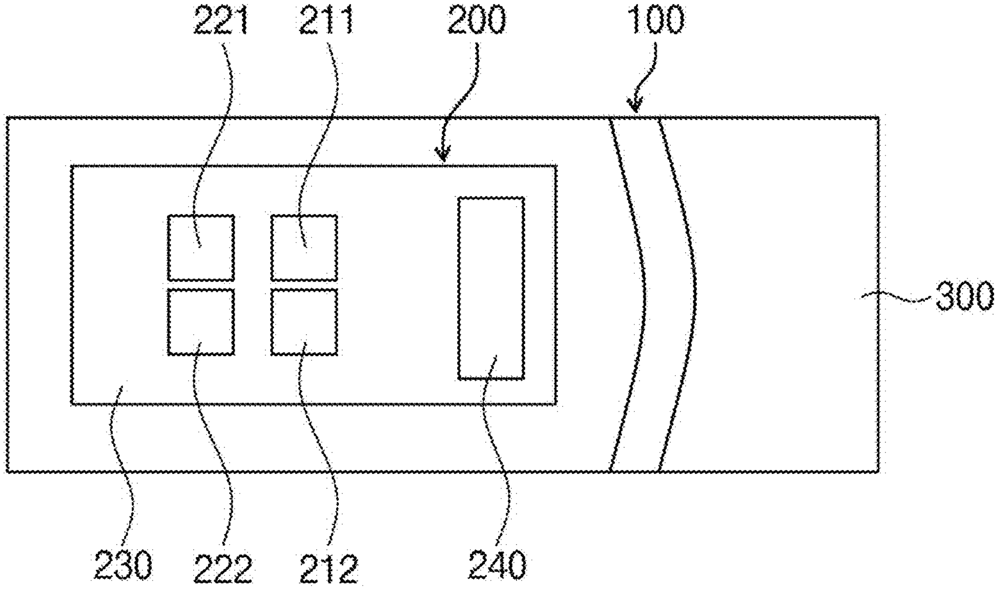
FIG. 10 is a plan view of a lighting apparatus according to one embodiment of the present disclosure.

FIG. 10 is a plan view of a lighting apparatus according to one embodiment of the present disclosure.

Referring to FIG. 10, the light source unit 200 includes multiple first light sources 211, 212 and multiple second light sources 221, 222. In addition, the light source unit 200 further includes a substrate 230 and a socket 240.

The multiple first light sources 211, 212 and the multiple second light sources 221, 222 may be parallel to each other and may be disposed on the same plane. Further, according to utility of the lighting apparatus, the number of first light sources 211, 212 may be different from the number of second light sources 221, 222.

The first light sources 211, 212 and the second light sources 221, 222 may be disposed on the substrate 230. The substrate 230 is coupled at one surface thereof to the support 300 and supports the first light sources 211, 212 and the second light sources 221, 222 on the other surface thereof. The substrate 230 may include an electric interconnect and an electric pad for connection of the first light sources 211, 212 and the second light sources 221, 222 to other components.

The substrate 230 may be provided at one side thereof with the socket 240. The socket 240 connects the first light sources 211, 212 and the second light sources 221, 222 to an external power source. The external power source may mean a power source outside the lighting apparatus. For example, the external power source may be a power source for a vehicle adopting the lighting apparatus.

As described above, with the multiple first light sources 211, 212 and the multiple second light sources 221, 222, the lighting apparatus according to the embodiment of the present disclosure may be applied to an apparatus requiring higher intensity of light.

Figure 11A:
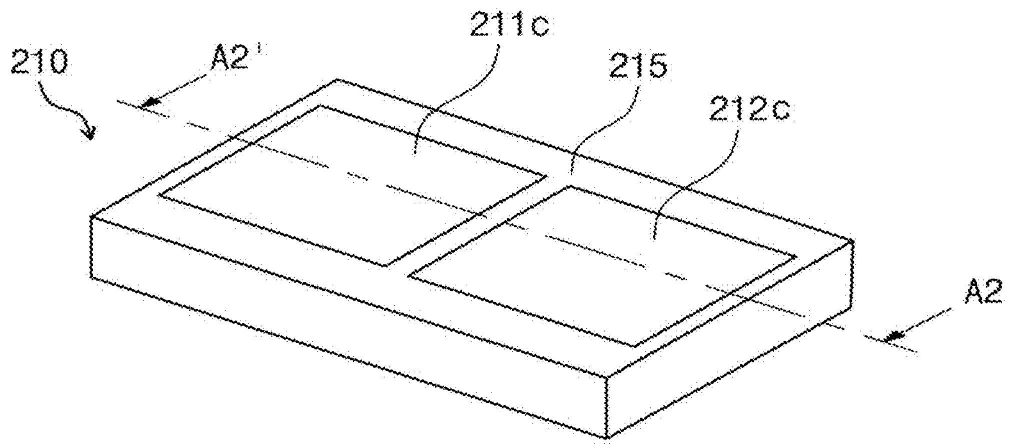
FIG. 11A is an enlarged perspective view of a light source unit of the lighting apparatus according to the embodiment of the present disclosure and FIG. 11B is a sectional view of the lighting apparatus taken along line A2-A2' of FIG. 11A.
Figure 11B:
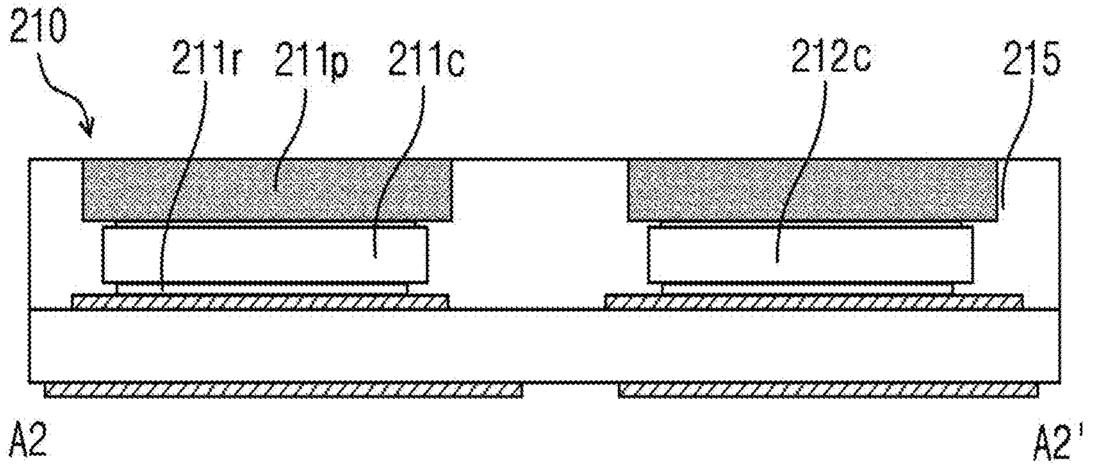

FIG. 11A is an enlarged perspective view of the light source unit of the lighting apparatus according to the embodiment of the present disclosure and FIG. 11B is a sectional view of the light source unit taken along line A2-A2' of FIG. 11A.

Referring to FIG. 11A and FIG. 11B, the first light source 210 is shown. The first light source 210 may include a first light emitting diode 211*c* and a second light emitting diode 212*c*. The first light emitting diode 211*c* and the second light emitting diode 212*c* may be surrounded by a first light source case 215.

The first light emitting diode 211*c* may be formed on one surface thereof with a phosphor layer 211*p* and on the other surface thereof with a reflective layer 211*r*. The phosphor layer 211*p* may include phosphors. The phosphors contained in the phosphor layer 211*p* may convert light emitted from the first light emitting diode 211*c* into light having a specific wavelength. The phosphors may include, for example, a garnet phosphor, an aluminate phosphor, a sulfide phosphor, an oxynitride phosphor, a nitride phosphor, a fluoride phosphor, a silicate phosphor, a quantum dot phosphor, and the like. In some embodiments, the phosphor layer 211*p* may be provided in the form of PIG (Phosphor-in-Glass) and bonded to the first light emitting diode 211*c*.

The reflective layer 211*r* may be formed on the other surface of the first light emitting diode 211*c* and may reflect light such that a first light component travels towards the phosphor layer 211*p*. The reflective layer 211*r* may be, for example, white silicone.

Like the first light emitting diode 211*c*, the second light emitting diode 212*c* may be formed on one surface thereof with a phosphor layer 211*p* and on the other surface thereof with a reflective layer.

Various types of light sources may be realized by the first light emitting diode 211*c* and the second light emitting diode 212*c*. Although not shown in the drawings, the first light emitting diode 211*c* and the second light emitting diode 212*c* may be provided in the form of high intensity flip-chip type or vertical type LEDs and may be electrically connected to a lower substrate.

The first light emitting diode 211*c* and the second light emitting diode 212*c* may be disposed in a light source case 215. The light source case 215 may cover a region other than a surface thereof adjoining the reflective layer 211*r* and the phosphor layer 211*p* of the first light emitting diode 211*c*.

The light source case 215 serves to guide light emitted from the first light emitting diode 211*c* and the second light emitting diode 212*c* to travel towards the reflector. Specifically, the light source case 215 covers side surfaces of the first light emitting diode 211*c* and the second light emitting diode 212*c* to prevent the light emitted from the first light emitting diode 211*c* and the second light emitting diode 212*c* from leaking through the side surfaces thereof instead of traveling towards the reflector. Accordingly, the first and second light emitting diodes 211*c*, 212*c* may emit light at an exit angle of about 120 degrees and most light emitted at this light exit angle enters the reflector.

The light source case 215 may exhibit different optical properties depending on a region thereof. For example, the light source case 215 may exhibit light transmittance, light translucency, or light reflectivity, particularly light reflectivity at an interface between the first light emitting diode 211*c* and the second light emitting diode 212*c*. Accordingly, among light emitted from the first light emitting diode 211*c* and the second light emitting diode 212*c*, light not traveling towards a region free from the phosphor layer 211*p* may be reflected from the light source case 215 to travel towards the phosphor layer 211*p*.

The light source case 215 may include a polymer resin, such as a silicone resin, an epoxy resin, a polyimide resin, a urethane resin, and the like. The light source case 215 may include fillers to scatter light emitted from the first light emitting diode 211*c* and the second light emitting diode 212*c*. Reflectivity or the degree of light scattering of the light source case 215 may be adjusted through adjustment of the kind and concentration of the fillers. The fillers may be evenly distributed in the light source case 215. The fillers may be prepared of a material capable of reflecting or scattering light. For example, the fillers may include at least one selected from among titanium oxide ($TiO_2$), silicon oxide ($SiO_2$) and zirconium oxide ($ZrO_2$).

According to the embodiment, the first light emitting diode 211*c* and the second light emitting diode 212*c* are covered by the light source case 215, and the phosphor layer and the reflective layer are formed on each of the first and second light emitting diodes 211*c*, 212*c*, thereby improving illumination efficiency of the lighting apparatus through concentration of light on the reflector when the light is emitted from the first and second light emitting diodes 211*c*, 212*c*.

In the above description, the structure of the light source unit has been described. Next, operation of the light source unit will be described in more detail.

Figure 12A:
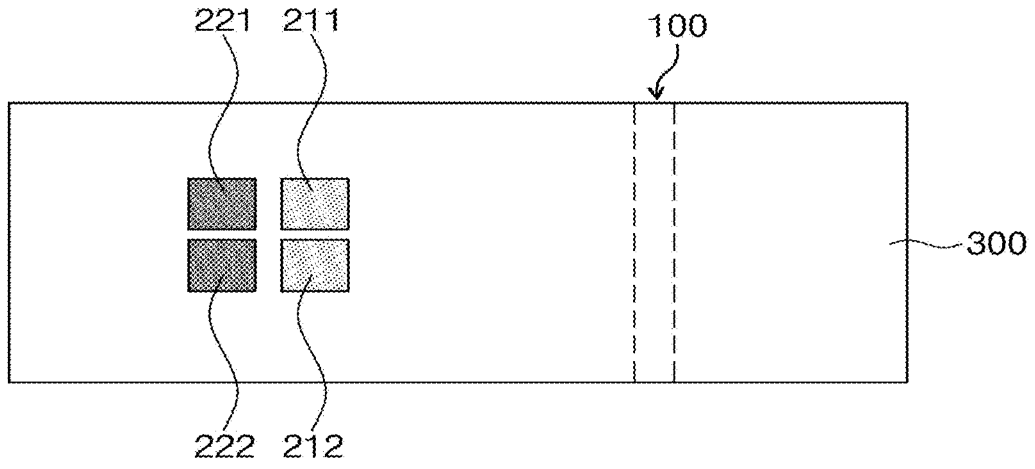
FIG. 12A is a plan view of a lighting apparatus according to one embodiment of the present disclosure in operation and FIG. 12B is a graph depicting an illumination pattern in operation of the lighting apparatus of FIG. 12A.
Figure 12B:
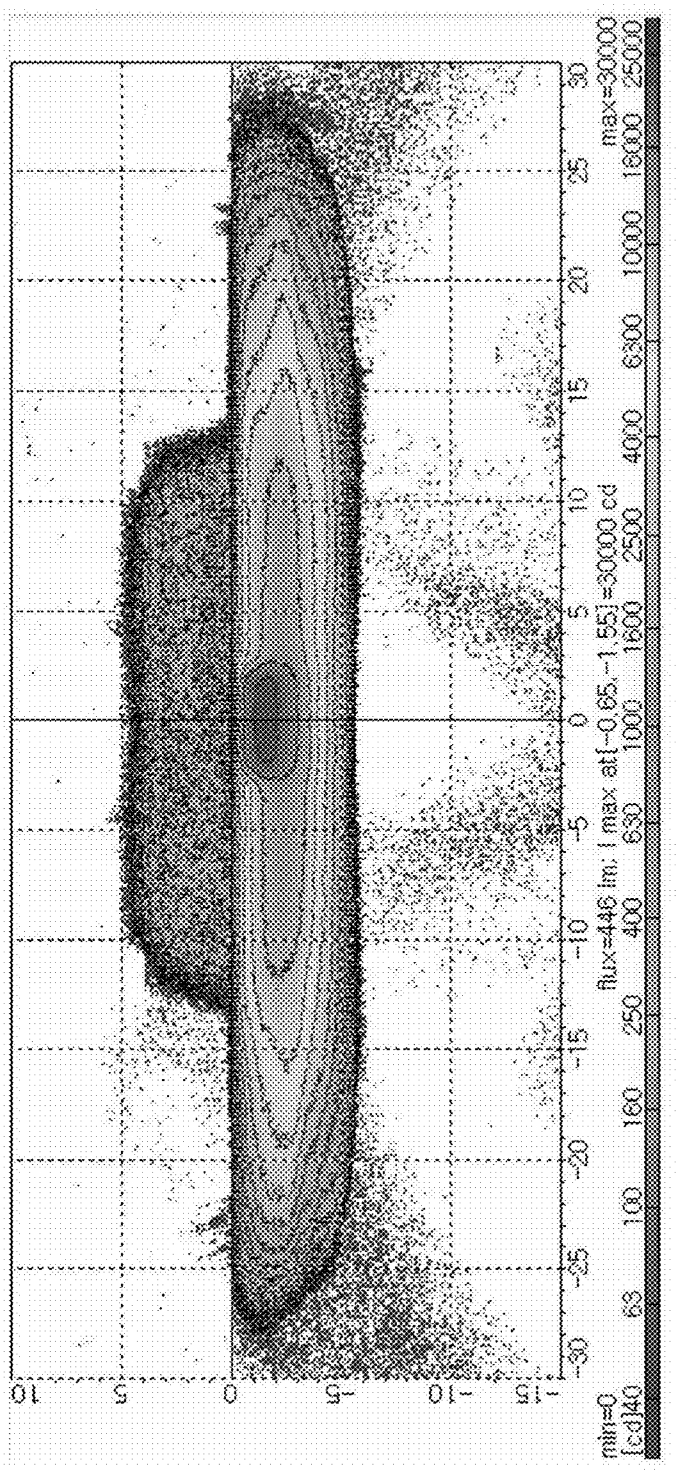

FIG. 12A is a plan view of a lighting apparatus according to one embodiment of the present disclosure in operation and FIG. 12B is a graph depicting an illumination pattern in operation of the lighting apparatus of FIG. 12A.

Figure 13A:
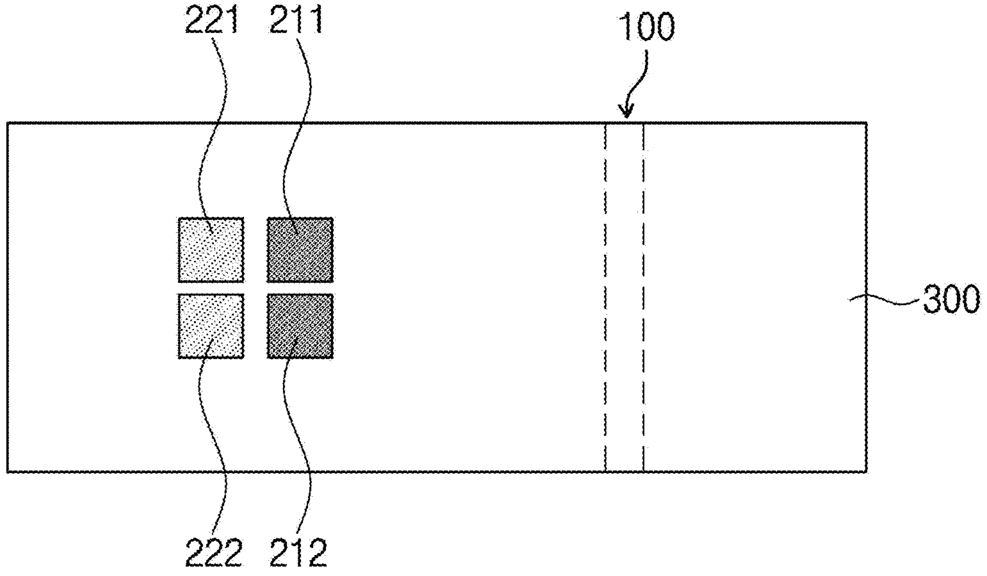
FIG. 13A is a plan view of a lighting apparatus according to one embodiment of the present disclosure in operation and FIG. 13B is a graph depicting an illumination pattern in operation of the lighting apparatus of FIG. 13A.
Figure 13B:
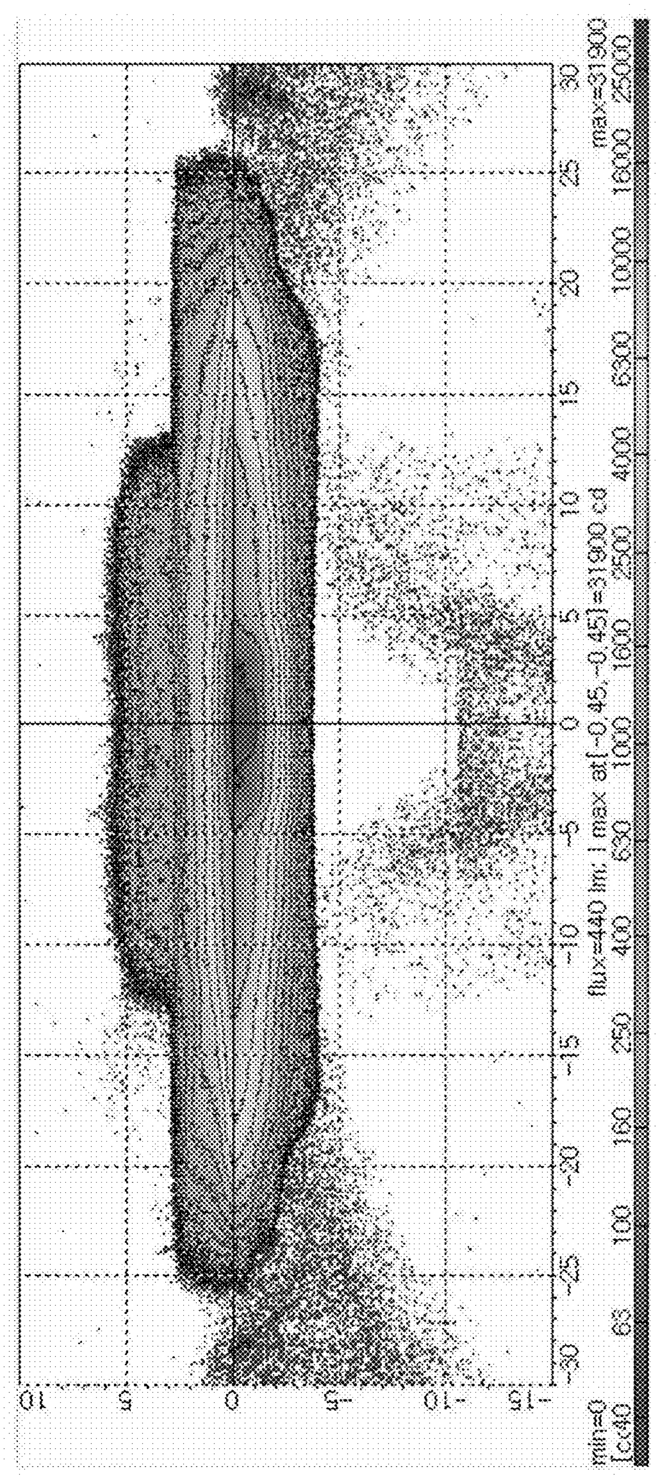

FIG. 13A is a plan view of a lighting apparatus according to one embodiment of the present disclosure in operation and FIG. 13B is a graph depicting an illumination pattern in operation of the lighting apparatus of FIG. 13A.

First light sources 211, 212 and second light sources 221, 222 may be independently operated to provide high beam and low beam. Specifically, in operation of the lighting apparatus for high beam, light may be emitted from the first light sources 211, 212 and in operation of the lighting apparatus for low beam, light may be emitted from the second light sources 221, 222.

Referring to FIG. 12A and FIG. 12B, upon operation of the lighting apparatus for low beam, most light emitted from the first light sources 211, 212 and reflected from the reflector 100 may reach a region of 0 degree or less in the second direction (y-axis direction), as shown in FIG. 12B. Here, the central region on which the reflected light is focused may also be a region of 0 degree or less in the second direction. Accordingly, in operation of the lighting apparatus for low beam, the reflected light may be focused on a road instead of reaching a vehicle approaching in the opposite direction.

On the contrary, as shown in FIG. 13A and FIG. 13B, in operation of the lighting apparatus for high beam, light may be emitted from the second light sources 221, 222. Further, in operation of the lighting apparatus for high beam, the first light sources 211, 212 may emit light together with the second light sources 221, 222, as needed. In operation of the lighting apparatus for high beam, a region of 0 degree or more and a region of 0 degree or less in the second direction (y-axis direction) may be relatively evenly illuminated with light reflected from the reflector 100, as shown in FIG. 13B. Further, the central region on which the reflected light is focused may be placed near a point at which the second direction axis meets the first direction axis.

Since the first light sources 211, 212 are placed at different locations from the second light sources 221, 222 with respect to the reflector 100, the reflector 100 reflects light emitted from the light sources in different reflection patterns. Specifically, the first light sources 211, 212 may be placed at the focal point of the parabolic line corresponding to the reflector 100 and the second light sources 221, 222 may be separated from the first light sources 211, 212 by a light distribution distance. With such a positional relationship between the first light sources 211, 212 and the second light sources 221, 222, the lighting apparatus can realize both high beam and low beam using a single reflector 100.

According to the embodiment, the lighting apparatus can realize both high beam and low beam using a single reflector 100 through selective operation of the first light sources 211, 212 and the second light sources 221, 222. As a result, the lighting apparatus can reduce the overall size thereof while improving the degree of design freedom.

Figure 14:
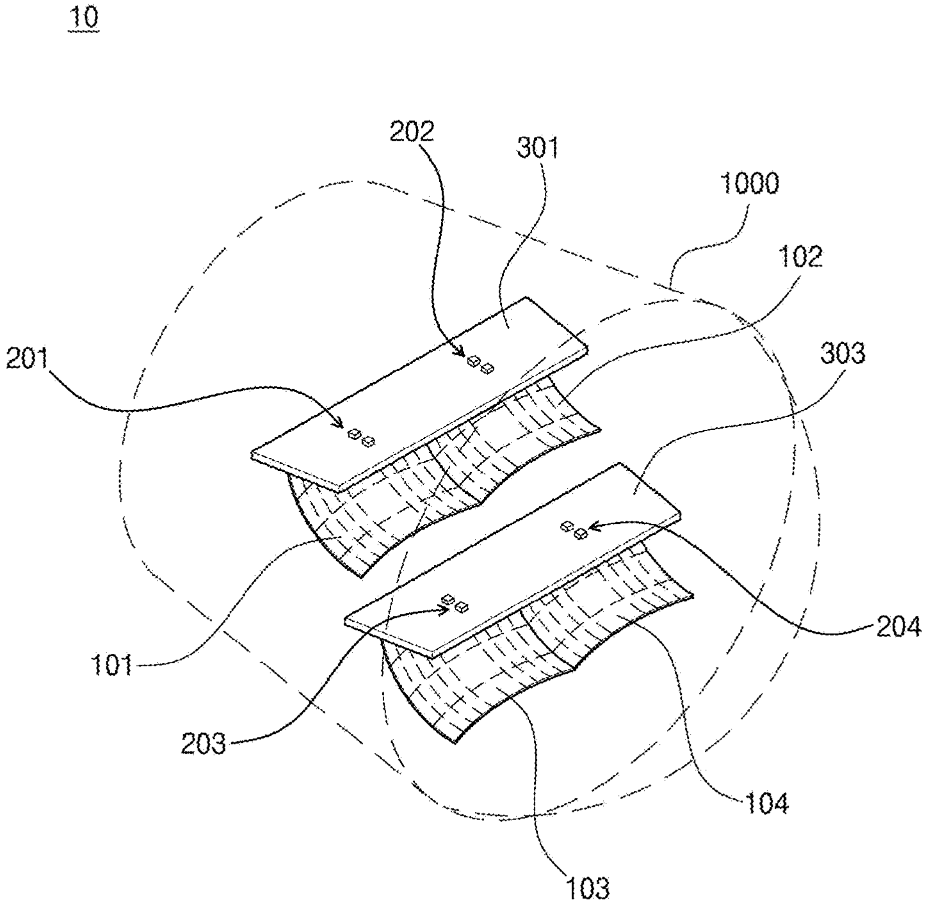
FIG. 14 is a perspective view of a lighting apparatus according to one embodiment of the present disclosure.

FIG. 14 is a perspective view of a lighting apparatus according to one embodiment of the present disclosure.

Referring to FIG. 14, the lighting apparatus includes multiple reflectors 101, 102, 103, 104 and multiple light source units 201, 202, 203, 204.

The multiple reflectors 101, 102, 103, 104 may be arranged in a 2×2 matrix, as shown in FIG. 14. In this case, the reflectors 101, 102, 103, 104 in the same column may be placed on one support 301 or 303. It should be understood that arrangement of the multiple reflectors 101, 102, 103, 104 is not limited thereto and the multiple reflectors 101, 102, 103, 104 may be linearly arranged.

The multiple light source units 201, 202, 203, 204 may be disposed in one-to-one correspondence to the multiple reflectors 101, 102, 103, 104. Each of the multiple light source units 201, 202, 203, 204 may include a first light source and a second light source.

The multiple light source units 201, 202, 203, 204 may be simultaneously or individually controlled. For example, in operation for low beam, the first light sources in the multiple light source units 201, 202, 203, 204 may be simultaneously or individually operated.

With the multiple light source units 201, 202, 203, 204 and the multiple reflectors 101, 102, 103, 104, the lighting apparatus may emit an increased quantity of light. Accordingly, the reflectors 101, 102, 103, 104 and the light source units 201, 202, 203, 204 may be provided in different ways depending on utility of the lighting apparatus.

Figure 15:
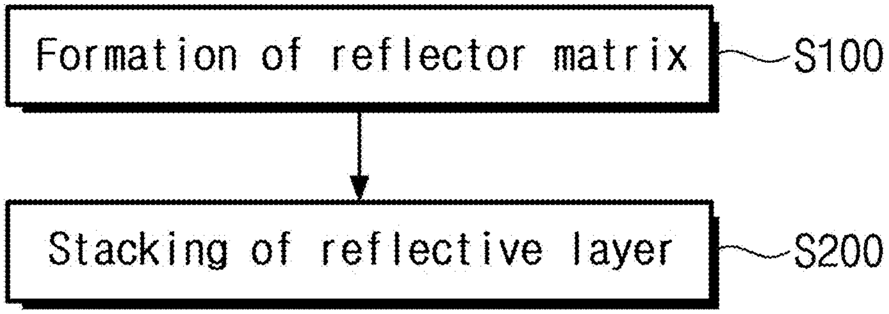
FIG. 15 is a perspective view illustrating a method of manufacturing a reflector of a lighting apparatus according to one embodiment of the present disclosure.

FIG. 15 is a perspective view illustrating a method of manufacturing a reflector of a lighting apparatus according to one embodiment of the present disclosure.

Referring to FIG. 15, for preparation of the reflector, first, a reflector matrix is formed (S100). Formation of the reflector matrix (S100) may be performed through injection-molding in a mold. Specifically, the reflector matrix may be formed by placing at least one selected from the group consisting of polyethylene, polypropylene, polyvinyl chloride, polystyrene, ABS (acrylonitrile-butadiene-styrene) resin, methacrylate resin, polyamide, polycarbonate, polyacetyl, polyethylene terephthalate, modified polyphenylene oxide (modified PPO), polybutylene terephthalate, polyurethane, phenolic resin, urea resin, melamine resin, and combinations thereof in the mold, followed by mold-heating and mold-cooling.

After formation of the reflector matrix, a reflective layer may be stacked on the reflector matrix (S200). The reflective layer may be formed through deposition on the reflector matrix. Here, in order to prevent thermal deformation of the reflector matrix in a reflector deposition process, the reflector deposition process may be carried out at a temperature less than or equal to the glass transition temperature of the material constituting the reflector matrix. The reflective layer may include a metal, such as silver (Ag), aluminum (Al), copper (Cu), platinum (Pt), gold (Au), chromium (Cr), and the like.

After formation of the reflective layer, thin film-coating may be further performed on the reflective layer. A thin film formed on the reflective layer may serve to improve reliability and heat resistance of the reflective layer while preventing the reflective layer from being peeled off.

Figure 16:
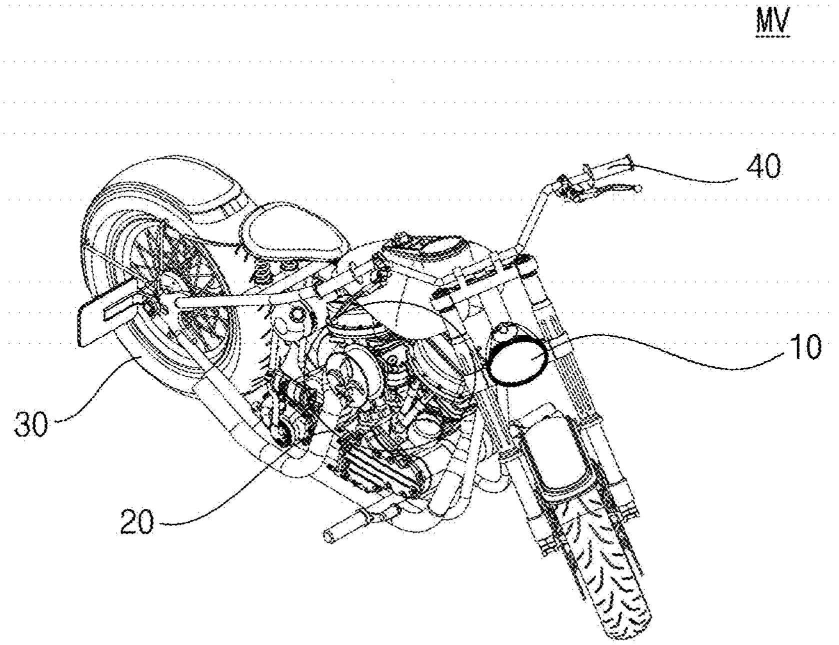
FIG. 16 is a perspective view of a mobile vehicle including a lighting apparatus according to one embodiment of the present disclosure.

FIG. 16 is a perspective view of a mobile vehicle including a lighting apparatus according to one embodiment of the present disclosure.

A mobile vehicle MV includes a power generator 20, a drive unit 30, a controller 40, a vehicle body, and a lighting apparatus.

The mobile vehicle MV may include various types of transportation means, such as motorcycles, automobiles, trucks, buses, and the like.

The vehicle body constitutes an external appearance of the mobile vehicle MV and corresponds to a chassis of the vehicle.

The power generator 20 generates power for movement of the mobile vehicle MV. Here, the power of the power generator 20 is kinetic energy and the power generator 20 may generate power through conversion of electric energy or fossil fuel energy into kinetic energy, or the like.

The drive unit 30 moves the vehicle body with power delivered from the power generator 20. The drive unit 30 may include a power transmission for receiving the power from the power generator 20 and wheels for moving the vehicle body.

The controller 40 controls the power generator 20 and the drive unit 30. Specifically, the controller 40 may control the power generator (20) to generate the power according to driver manipulation and the drive unit 30 to change a driving direction of the vehicle.

The lighting apparatus is provided to the vehicle body and emits light. For example, the lighting apparatus may be a headlamp 10 of the mobile vehicle MV. Details of the lighting apparatus can be referred to the embodiments described above.

The lighting apparatus may be controlled by the controller 40. For example, the lighting apparatus may be controlled to operate the first light source in operation for low beam and to operate the second light source in operation for high beam.

Although some embodiments have been described herein, it should be understood that various modifications, changes, alterations, and equivalents can be made by those skilled in the art without departing from the spirit and scope of the invention.

Therefore, the scope of the present disclosure is not limited to the detailed description herein and should be defined only by the accompanying claims and equivalents thereto.

The invention claimed is:

1. A light apparatus, comprising:

a light source group including a first light source and a second light source, wherein the light source group is configured to emit a first type of light and a second type of the light;

a supporter including a conductive pattern and having a first surface and a second surface opposite to the first surface and configured to support the light source group such that the first light source and the second light source are disposed on a same plane of the supporter; and a reflector having a portion disposed on the first surface of the supporter and configured to reflect light emitted from the first light source and the second light source;

wherein the first light source and the second light source are separated from each other, wherein the reflector includes a first region having a first size and a second region having a second size different from the first size, and wherein the first region is arranged in a first direction and the second region is arranged in a second direction different from the first direction.

2. The light apparatus according to claim 1, wherein:

at least one of the reflective regions has a surface with a curved shape.

3. The light apparatus according to claim 1, wherein at least one of the reflective regions has a surface with a shape different from surfaces of one or more neighboring reflective regions.

4. The light apparatus according to claim 1, wherein the reflective regions extend in the first direction and the second direction and at least some of the reflective regions are connected to each other.

5. The light apparatus according to claim 1, wherein the reflective regions are arranged to have a symmetrical shape.

6. The light apparatus according to claim 1, wherein at least one of the reflective regions has a width different from a width of another reflective region.

7. The light apparatus according to claim 1, wherein each of the first light source and the second light source includes conductivity type semiconductor layers and an active layer.

8. The light apparatus according to claim 7, wherein each of active layers of the first light source and the second light source has a quantum well structure, and a composition of semiconductor material of each of the active layers is predetermined to adjust a wavelength of light from each of the active layers.

9. The light apparatus according to claim 1, wherein at least two of the reflective regions that are arranged in the second direction have reflective surfaces with different shapes from each other.

10. The light apparatus according to claim 1, wherein at least one of the reflective regions has a height different from a height of another reflective region.

11. The light apparatus according to claim 1, wherein:

a distance between a center of the first light source and a center of the second light source ranges from 0.8 mm to 1.2 mm.

12. The light apparatus according to claim 1, wherein the first type of light provides a broader illumination region than an illumination region provided by the second type of light.

13. The light apparatus according to claim 1, wherein the light source group comprises:

a substrate on which the first light source and the second light source are mounted; and a socket disposed on the substrate and connecting the first light source and the second light source to an external power source.

14. The light apparatus according to claim 1, further comprising:

a heat dissipater to remove heat from the first light source and the second light source.

15. The light apparatus according to claim 1, further comprising:

a circuit board having an electrode pattern; and a housing covering the light source group, the supporter, and the reflector.

16. A vehicle, comprising:

a vehicle body;

a power generator generating power;

a controller controlling the power generator; and a light apparatus provided to the vehicle body and emitting light, the light apparatus comprising:

a light source group comprising a first light source and a second light source separated from the first light source and operable to realize a first type of light and a second type of light;

a supporter having a first surface and a second surface opposite to the first surface and configured to support the light source group such that the first light source and the second light source are disposed on the first surface of the supporter; and a reflector disposed on the first surface of the supporter and configured to reflect light emitted from the first light source and the second light source, wherein the reflector includes a first region having a first size and a second region having a second size different from the first size, and wherein the first region is arranged in a first direction and the second region is arranged in a second direction different from the first direction.

17. The vehicle of claim 16, wherein upon operation light source group, the first type of light is configured that a light emitted from the first light source is far from a center of the first type of light than a light emitted from the second light source.

18. The vehicle of claim 16, wherein the first type of light includes a light increased quantity than that of the second type of light.

19. The vehicle of claim 16, wherein the first type of light provides a broader illumination region than that an illumination region provided by the second type of light.

20. The vehicle of claim 16, wherein each of the first light source and the second light source includes an active layer, and each of active layers of the first light source and the second light source has a quantum well structure such that a composition of semiconductor material of each of the active layers is predetermined to adjust a wavelength of light from each of the active layers.

* * * * *